United States Patent
Yonezawa et al.

(10) Patent No.: US 7,477,576 B2
(45) Date of Patent: Jan. 13, 2009

(54) OPTICAL DISK APPARATUS AND METHOD OF TILT CONTROL

(75) Inventors: Minoru Yonezawa, Tokyo (JP); Yuichiro Yamamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 608 days.

(21) Appl. No.: 11/296,922

(22) Filed: Dec. 8, 2005

(65) Prior Publication Data

US 2006/0140089 A1    Jun. 29, 2006

(30) Foreign Application Priority Data

Dec. 10, 2004    (JP)    .............................. 2004-359144

(51) Int. Cl.
*G11B 7/00*    (2006.01)

(52) U.S. Cl. ............... 369/44.32; 369/53.19; 369/275.1

(58) Field of Classification Search ........................ None
See application file for complete search history.

(56) References Cited

U.S. PATENT DOCUMENTS

| | | | | | |
|---|---|---|---|---|---|
| 6,160,772 | A | * | 12/2000 | Muramatsu | ............... 369/44.32 |
| 2001/0055255 | A1 | * | 12/2001 | Ma et al. | ................. 369/53.19 |
| 2002/0080707 | A1 | * | 6/2002 | Abe et al. | ................. 369/59.27 |
| 2005/0207303 | A1 | | 9/2005 | Yonezawa | |

FOREIGN PATENT DOCUMENTS

| | | |
|---|---|---|
| JP | 11-016216 | 1/1999 |
| JP | 2000-311368 | 11/2000 |
| JP | 2001-307359 | 11/2001 |
| JP | 2003-217153 | 7/2003 |

OTHER PUBLICATIONS

Japanese Office Action dated Dec. 4, 2007 corresponding to U.S. Appl. No. 11/296,922.

* cited by examiner

*Primary Examiner*—Muhammad N. Edun
(74) *Attorney, Agent, or Firm*—Amin, Turocy & Calvin, LLP

(57) ABSTRACT

An optical disk apparatus includes an objective lens that condenses light on an information recording layer of an optical disk that has a first area with a first track pitch and a second area with a second track pitch, to form an optical spot. The apparatus also includes a tilt driver that inclines the objective lens; a positioning unit that positions the optical spot on a target track; a position error detector that detects a position error of the optical spot from the target track; a tilt detection correcting unit that calculates a tilt error signal based on a first position error detected when the optical spot is positioned on a target track in the first area and a second position error detected when the optical spot is positioned on a target track in the second area; and a tilt controller that controls an inclination based on the tilt error signal.

12 Claims, 25 Drawing Sheets

FIG.6A
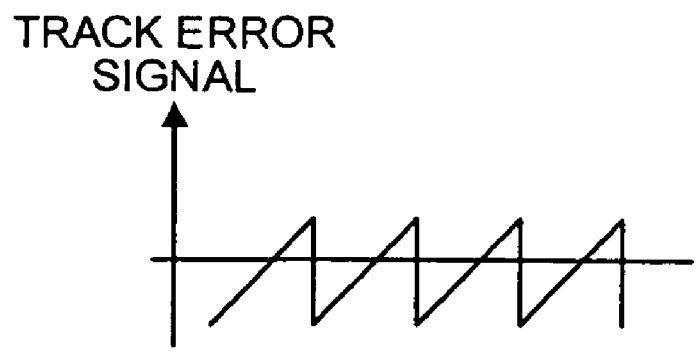
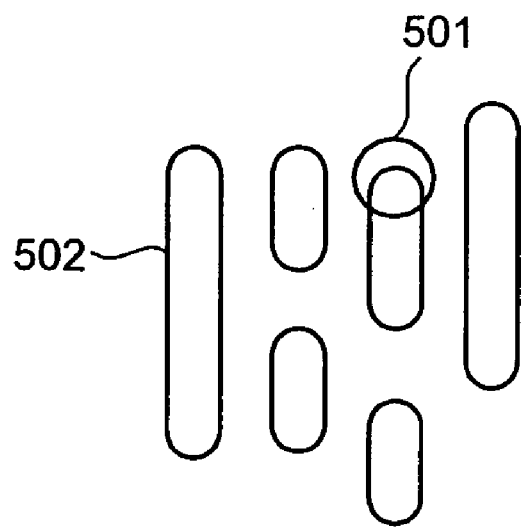
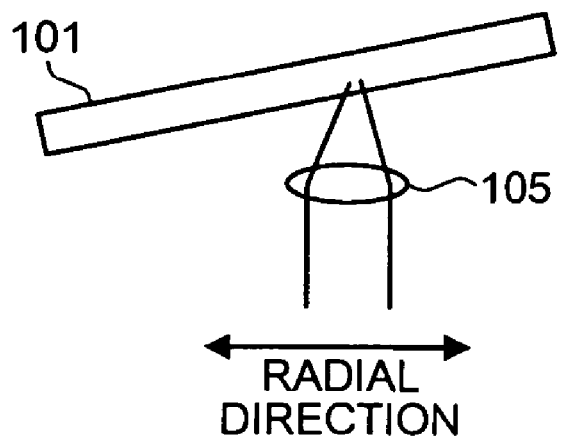
INCLINATION OF DISK +0.8 DEGREE

FIG.6B
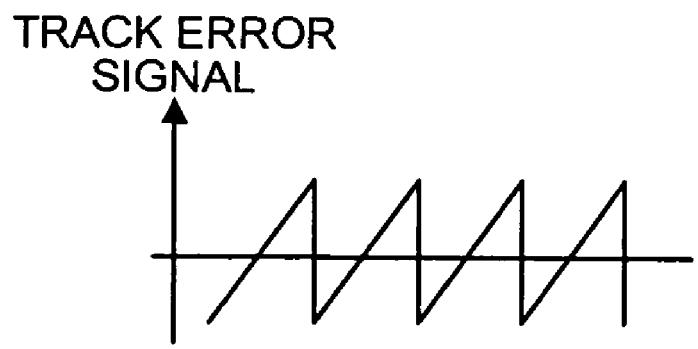
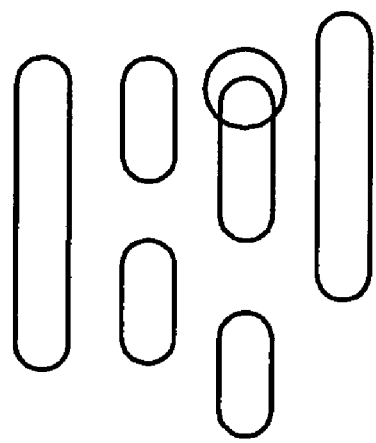
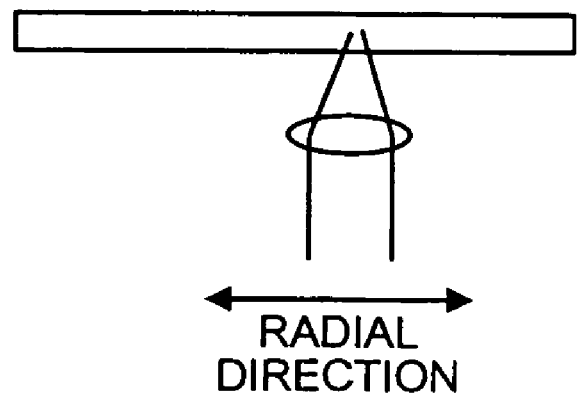
INCLINATION OF DISK +0 DEGREE

FIG.6C
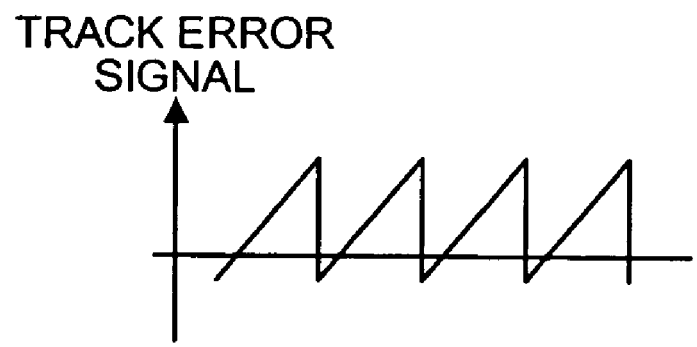
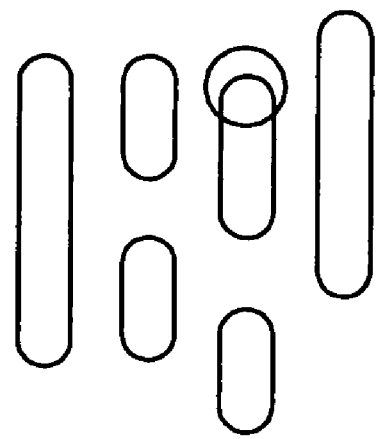
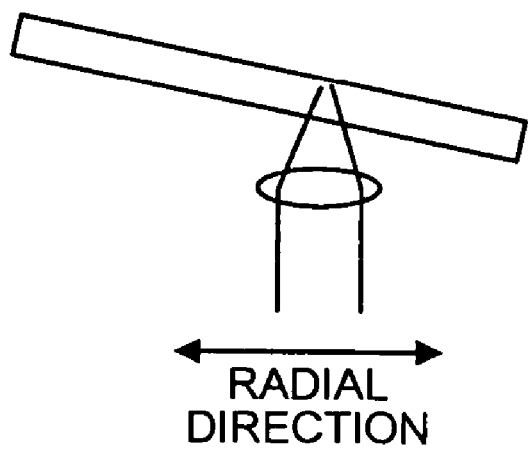
INCLINATION OF DISK -0.8 DEGREE

TILTING ANGLE α OF DISK

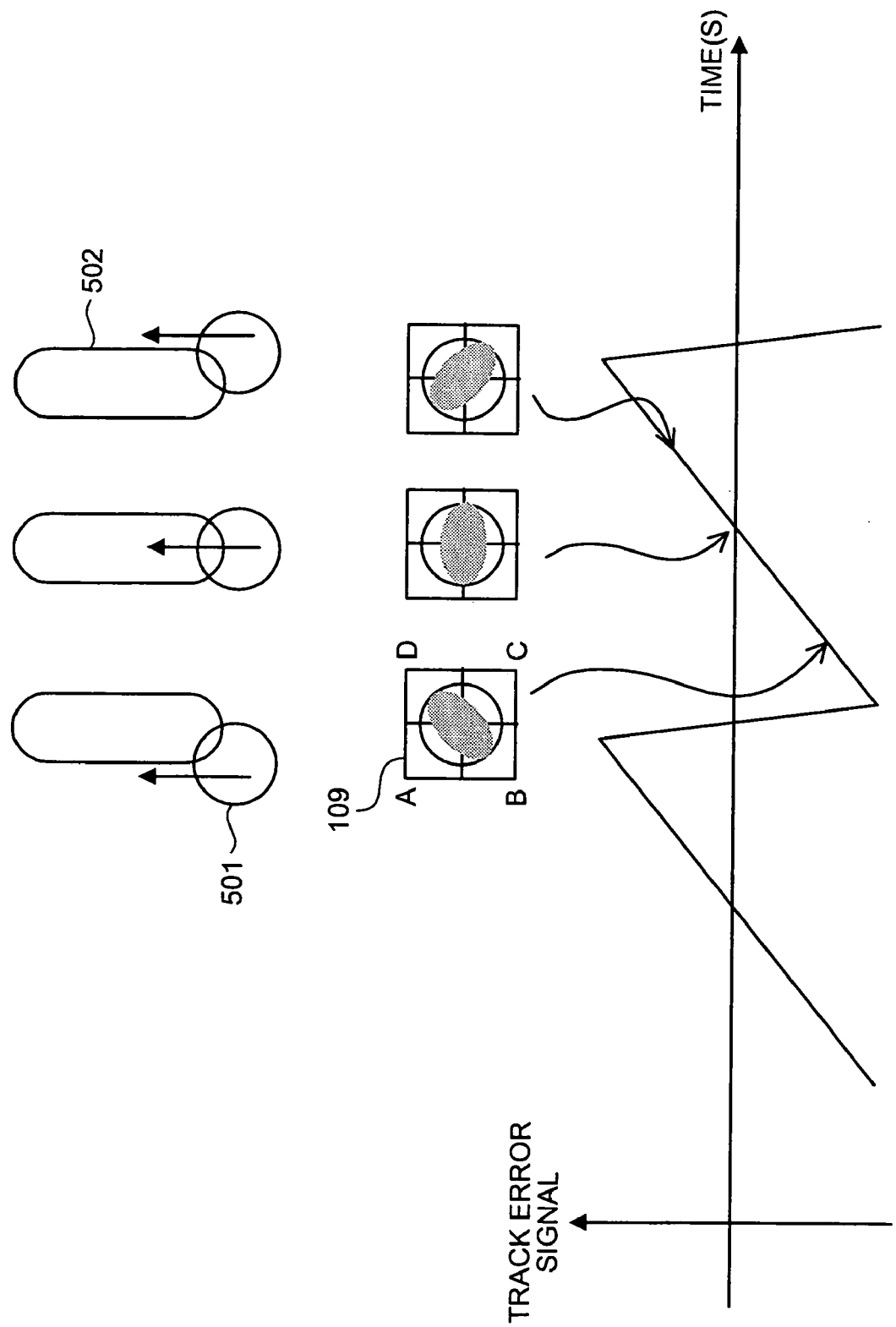

OPTICAL DISK APPARATUS AND METHOD OF TILT CONTROL

CROSS-REFERENCE TO RELATED APPLICATIONS

This application is based upon and claims the benefit of priority from the prior Japanese Patent Application No. 2004-359144, filed on Dec. 10, 2004; the entire contents of which are incorporated herein by reference.

BACKGROUND OF THE INVENTION

1. Field of the Invention

The present invention relates to an optical disk apparatus which can record and reproduce high-density information for digital high definition video data or High-Vision video data for example. More particularly, the present invention relates to an optical disk apparatus which can realize an improved tilt control accommodating a state of inclination of the optical disk, and a method of tilt control.

2. Description of the Related Art

A disk drive for an optical disk is provided with an optical head (i.e., an objective lens) which is disposed so as to face a recording surface of the optical disk when the optical disk is inserted into the disk drive. In recent years, increasing recording density of the optical disk, in which recording and reproduction are realized with a short wavelength laser, requires that the inclination angle of the optical head be adequately compensated over the entire surface of the disk, i.e., entirely from an inner periphery to an outer periphery. One manner of compensation for the angle of inclination is called tilt control. A combination of the tilt control, a focus control and a tracking control (alignment/positioning control) of the optical head allows for recording and reproduction of information to and from a high-density optical disk.

One conventional technique of the tilt control implements the tilt control prior to the tracking as disclosed in FIG. 11 of Japanese Patent Application Laid-Open No. 2003-217153. For example, Japanese Patent Application Laid-Open No. 2003-217153 discloses the tilt control employing a push-pull tracking error signal for tilt compensation.

For the implementation of the tilt control as described above, a relation between an amount of correction of inclination and amplitude of a detected reproduction signal needs to be known corresponding to the inclination angle (tilt) of the optical head. On the other hand, Japanese Patent Laid-Open No. 2000-311368 discloses a so-called hill-climbing method according to which the tilt of the optical head is changed to both negative and positive angles and an angle where the correction amount is optimal is selected.

According to a third conventional technique disclosed in Japanese Patent Application Laid-Open No. 2001-307359, a tilt error signal is generated based on a difference between a differential phase detection (DPD) signal and a push-pull signal for the tilt control. Here, the DPD signal is obtained through: finding each sum of signals supplied from diagonally arranged photodetectors, comparing phases of two acquired signals, and using the phase difference as a track position error signal. When the tilt error signal is generated based on the difference between the DPD signal and the push-pull signal, both the DPD signal and the push-pull signal are offset due to the tilt, and influenced also by a shift of the objective lens. The third conventional technique regards the influence of the tilt on the DPD signal as insignificant, and finds the difference between the DPD signal and the push-pull signal in order to offset the influence of the lens shift, thereby allowing detection of only a component of the tilt that has a different influence on the DPD signal and the push-pull signal.

When the first conventional technique is applied, for example, to an optical disk which is 12 centimeters (cm) in diameter and capable of storing the Hi-Vision data using a blue laser, however, the amount of tilt is difficult to be distinguished from the lens shift factors. Hence the detection of the amount of tilt from the push-pull signal is not a realistic solution. Further, the second conventional technique, dissimilar to the first conventional technique, performs the tracking control before the tilt control and utilizes the amplitude of the reproduction signal obtained in the tracking control in the tilt control (see FIG. 4 of the cited document). In such case, the accuracy of the tilt control might be deteriorated by the influence of the tracking control. Still further, the third conventional technique needs to simultaneously detect the DPD signal and the push-pull signal, and a circuit structure for realization of such detection is significantly complicated.

In addition, in the optical disk intended for high-density information recording such as the 12 cm optical disk capable of storing High-Vision video data using a blue laser, the amount of tilt is difficult to detect and a favorable tilt control is not easy to realize. Such inconvenience arises not only in a disk with a single recording layer on one surface, but also in a disk with plural recording layers on one surface, in which laser reflectance decreases to complicate the problem.

SUMMARY OF THE INVENTION

According to one aspect of the present invention, an optical disk apparatus includes an objective lens that condenses light on an information recording layer of an optical disk that has a first area with a first track pitch and a second area with a second track pitch different from the first track pitch, to form an optical spot; a tilt driver that inclines the objective lens; a positioning unit which positions the optical spot on a target track; a position error detector that detects a position error of the optical spot from the target track to which the positioning unit positions the optical spot; a tilt detection correcting unit that calculates a tilt error signal based on a first position error detected by the position error detector when the optical spot is positioned on a target track in the first area and a second position error detected by the position error detector when the optical spot is positioned on a target track in the second area; and a tilt controller that controls the tilt driver based on the tilt error signal calculated by the tilt detection correcting unit.

According to another aspect of the present invention, a method of tilt control includes condensing light by an objective lens on an information recording layer of an optical disk which has a first area with a first track pitch and a second area with a second track pitch that is different from the first track pitch, to form an optical spot; positioning the optical spot on a target track of the first area; detecting a first position error of the optical spot from the target track, to which the optical spot is positioned, in the first area; positioning the optical spot on a target track of the second area; detecting a second position error of the optical spot from the target track of the second area to which the optical spot is positioned; calculating a tilt error signal based on the first position error and the second position error; and controlling a tilt driver that inclines the objective lens based on the calculated tilt error signal.

BRIEF DESCRIPTION OF THE DRAWINGS

FIG. 6A shows a differential phase track error signal when the optical disk is inclined toward the objective lens by +0.8 degrees;

FIG. 6B shows a differential phase track error signal when the optical disk is inclined toward the objective lens by +0 degrees;

FIG. 6C shows a differential phase track error signal when the optical disk is inclined toward the objective lens by −0.8 degrees;

FIG. 9 is an explanatory diagram of an example of the differential phase track error signal detected by a quadrant photodetector;

FIGS. 21A to 20C show phases of the signals output from adders in the data area at various disk inclinations (−$\alpha$, 0, +$\alpha$);

DETAILED DESCRIPTION OF THE EMBODIMENTS

Exemplary embodiments of an optical disk apparatus and a method of tilt control according to the present invention will be described in detail with reference to the accompanying drawings.

First, a first embodiment will be described.

An optical disk apparatus according to the first embodiment calculates a highly accurate tilt error signal based on a difference in polarity of track position error signals detected from areas with different track pitches described later in the optical disk.

Figure 1:
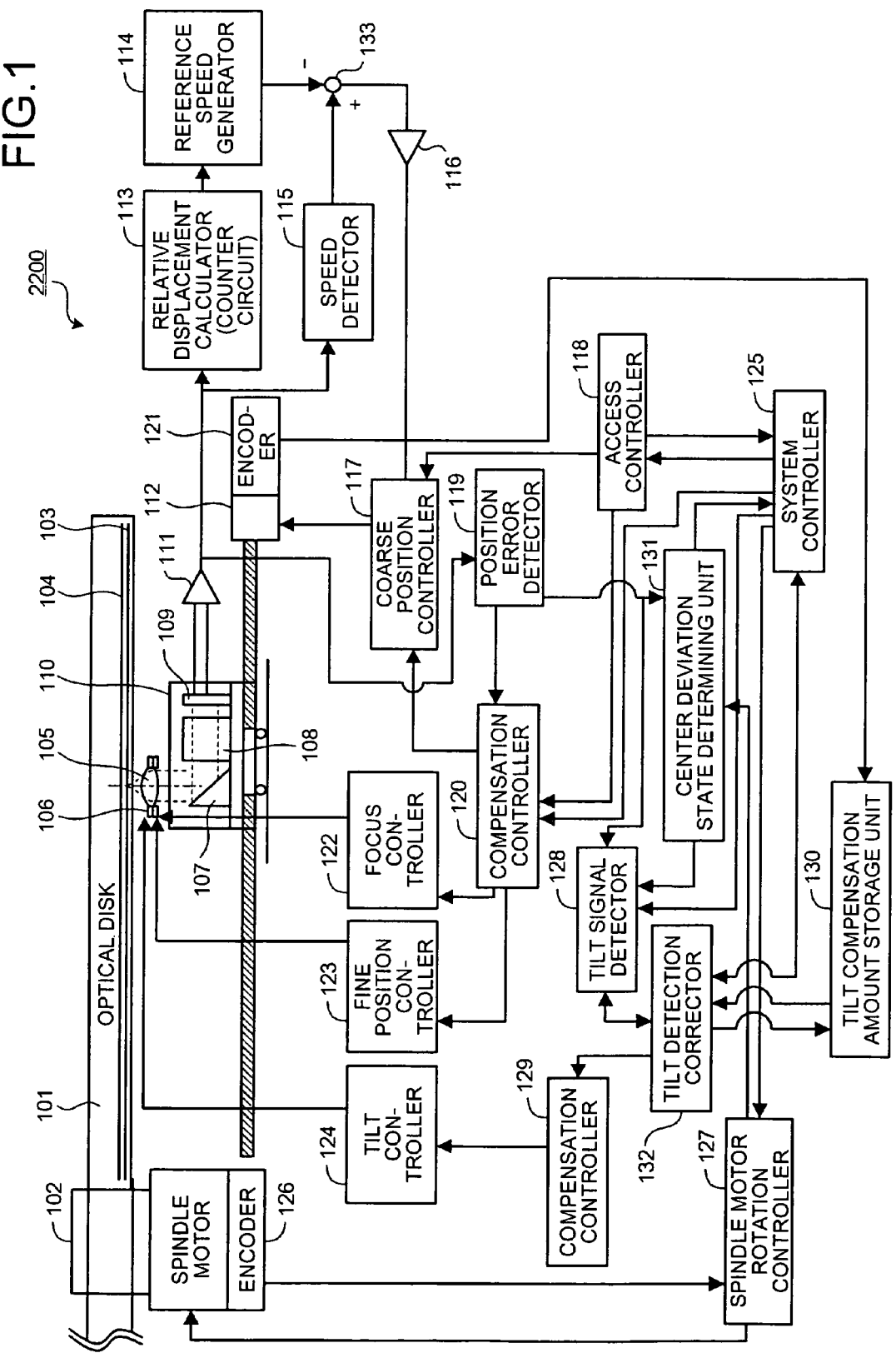
FIG. 1 is a block diagram of a structure of an optical disk apparatus according to a first embodiment.

FIG. 1 is a block diagram of a structure of an optical disk apparatus 100 according to the first embodiment. As shown in FIG. 1, the optical disk apparatus 100 records and reproduces information on and from an optical disk 101 which has a single or plural information recording layers 103, 104 on one surface.

The optical disk 101 is a rewritable medium provided with a phase-change recording layer as an information recording layer or a reproduction only media provided with an information recording layer formed of information pits, and information is recorded and reproduced thereon and therefrom by a laser beam condensed through an objective lens 105. The information recording is realized with a mark length recording, for example, according to which information is recorded in an edge portion of a recording mark.

A structure of the optical disk 101 on and from which the optical disk apparatus 100 according to the first embodiment records and reproduces the information will be described in detail.

Figure 2:
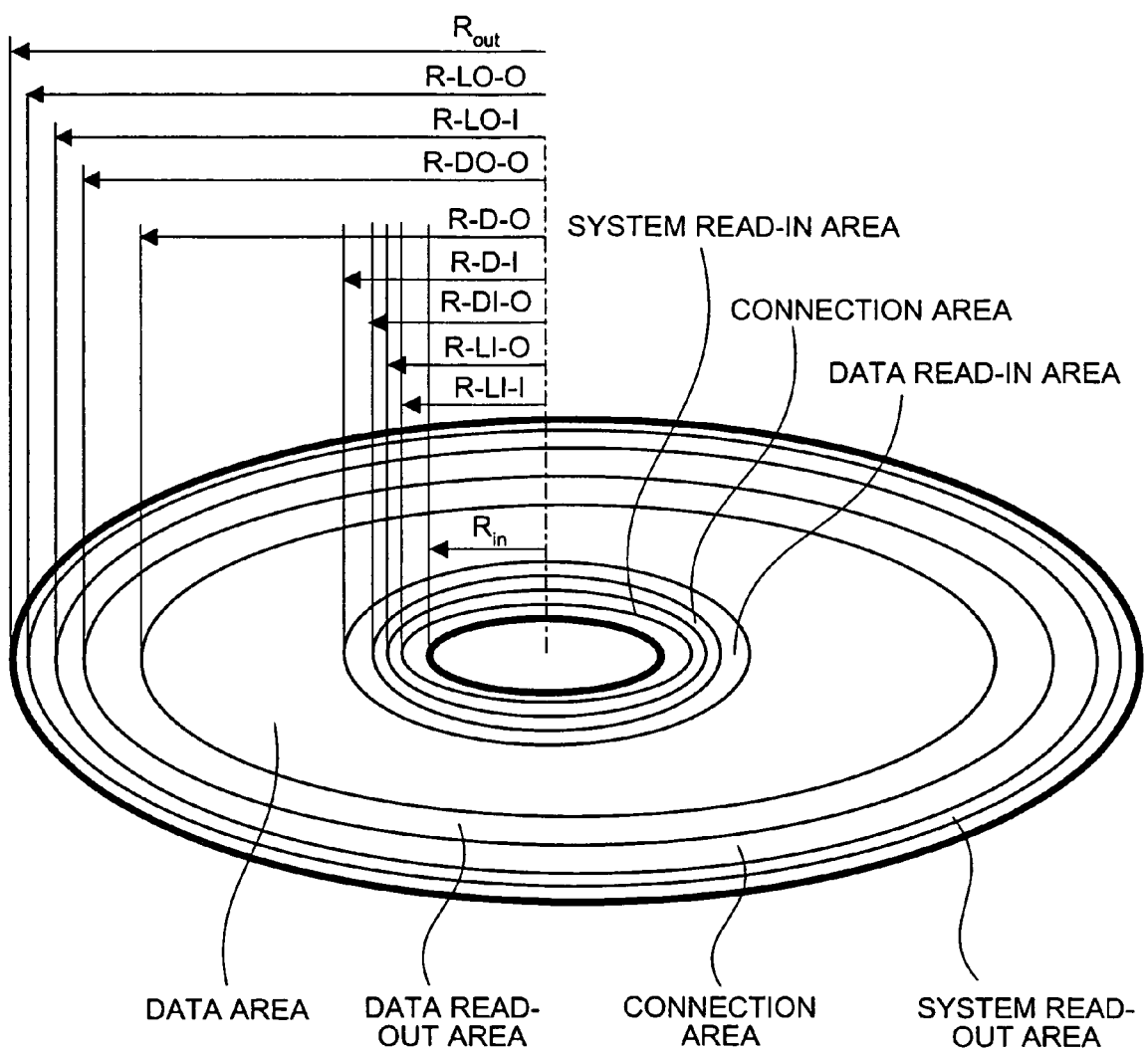
FIG. 2 is an explanatory diagram of an example of an optical disk (a type having one layer on one surface)

FIG. 2 is a schematic diagram of an example of a structure of an optical disk provided with a single recording layer on one surface, and information can be recorded on and reproduced from the optical disk by the optical disk apparatus 100 according to the first embodiment. As shown in FIG. 2, the optical disk with a single recording layer on one surface includes a system read-in area, a connection area, and a data read-in area arranged in this order from an innermost periphery to an outer periphery. Surrounding an outer periphery of the data read-in area, a data area is formed for an actual storage of data to be recorded and reproduced in a wide area, surrounded further by a data read-out area. Surrounding the data read-out area, a connection area, and then a system read-out area are formed.

Here, the system read-in area is an area where necessary information for the control of the disk drive and the like is stored, whereas the system read-out area is an area where information indicating an end portion of the information recording area is stored. The data read-in area is where information indicating the beginning of the data recording is stored, whereas the data read-out area is where information indicating the end of the recorded data is stored. The data area is an area in which actual data is recorded and from which actual data is reproduced, and the connection area is an area where no information is recorded, and provided between the data area and the system read-in area.

Figure 3:
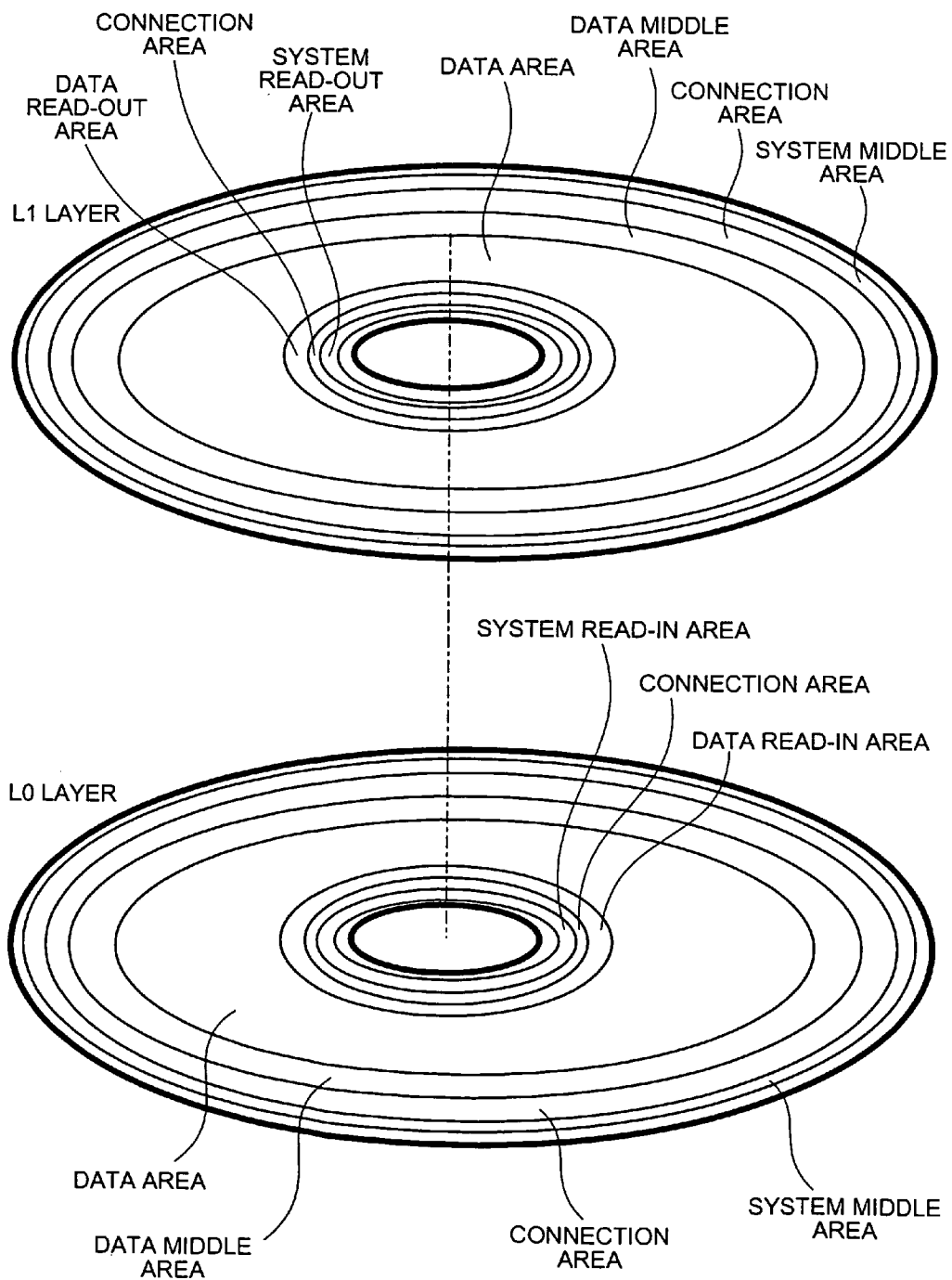
FIG. 3 is an explanatory diagram of another example of the optical disk (a type having two layers on one surface)

FIG. 3 is a schematic diagram of an example of a structure of an optical disk with two recording layers on one surface, and information can be recorded thereon and reproduced therefrom by the optical disk apparatus 100 according to the first embodiment. As shown in FIG. 3, a first layer (L0 layer) disposed on a closer side to the optical head 110 when the optical disk is mounted onto the optical disk apparatus 100 includes a system read-in area at an innermost periphery, surrounded by a connection area, then, by a data read-in area. Surrounding the data read-in area, a data area of the L0 layer is formed in a wide range, surrounded by a data middle area. Surrounding the data middle area, a connection area, and then a system middle area are formed.

On a second layer (L1 layer) of the optical disk with two recording layers on one surface, a system middle area is formed at an outermost periphery, and a connection area and a data middle area are formed inside in this order. Surrounded by the data middle area, a data area of the L1 layer is formed in a wide range and a data read-out area is formed inside the data area. Inside the data read-out area, a connection area and a system read-out area are formed in this order.

Here, the data middle area, and the system middle area are areas for storing information indicating a switching from the L0 layer to the L1 layer.

Figure 4:
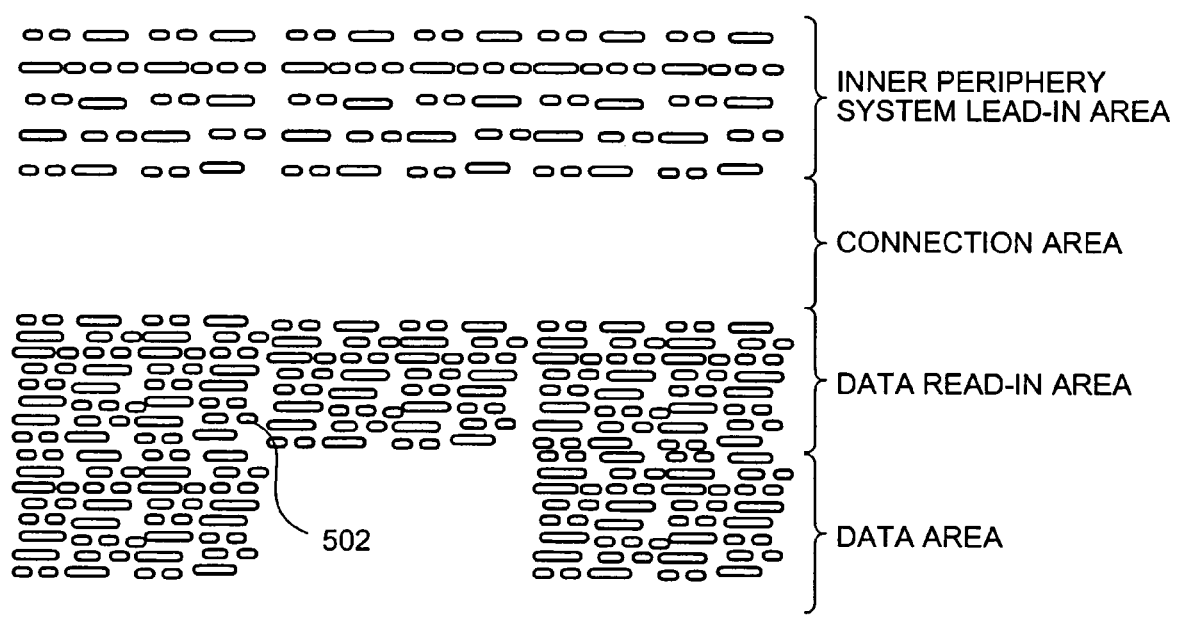
FIG. 4 is a schematic diagram of an example of a structure of a track pitch of the optical disk.

FIG. 4 is a schematic diagram of an example of a structure of a track pitch of the optical disk 101. A horizontal line formed by information pits 502s is one information track and an interval between information tracks represents a track pitch. As shown in FIG. 4, the track pitch of the system read-in area is wider than the track pitch of the data area. In the optical disk apparatus 100 according to the first embodiment, an amount of tilt error can be calculated at high accuracy based on a difference in track position error signals described later of respective areas. Such difference is attributable to the structure itself.

The optical disk on which information can be recorded and from which information can be reproduced by the optical disk apparatus 100 according to the first embodiment is not limited to the one described above, and an optical disk provided with two recording layers on both surfaces, or an optical disk provided with three or more recording layers can be processed on the optical disk apparatus 100 as far as the optical disk is structured as to have areas with different track pitches, for example, the system read-in area or the system read-out area with a different track pitch from that of the data area.

Returning to FIG. 1, the optical disk apparatus 100 according to the first embodiment includes a spindle motor 102, the objective lens 105, a lens driver 106, an optical head 110, an operation amplifying circuit 111, a positioning unit 112, a relative displacement calculator 113, a reference speed generator 114, a speed detector 115, an amplifier 116, a coarse position controller 117, an access controller 118, a position error detector 119, a compensation controller 120, an encoder 121, a focus controller 122, a fine position controller 123, a tilt controller 124, a system controller 125, an encoder 126, a spindle motor rotation controller 127, a tilt signal detector 128, a compensation controller 129, a tilt compensation amount storage unit 130, a center deviation state determining unit 131, a tilt detection correcting unit 132, and a comparison circuit 133.

The spindle motor 102 is a motor that rotates the optical disk 101 at high speed. Generally, a Constant Linear Velocity (CLV) is employed to maintain the linear rotation speed at a constant level during information reproduction. The objective lens 105 condenses a laser beam on the information recording layers 103 and 104 of the optical disk 101. The lens driver 106 is structured so as to drive the objective lens 105 around three axes, and moves or inclines the objective lens 105 so as to improve the quality of the optical spot where the laser beam is condensed through the objective lens 105.

Here, the structure of the lens driver 106 is not limited to the three-axes structure, and the lens driver 106 may be structured so as to incline a platform of the disk drive unit, or so as to incline the optical disk 101 together with the spindle motor 102.

The optical head 110 irradiates the predetermined information recording layers 103 and 104 of the optical disk 101 with a laser beam of a predetermined wavelength (650 nanometers (nm) or 405 nm, for example) to form a mark, for example, and thus achieves information recording or reproduction. The optical head 110 has a micro mirror 107 that is employed to transmit the laser beam to the optical disk 101 and the laser beam reflected by the optical disk 101, an optical correction mechanism 108 that corrects an astigmatism of the laser beam by a relay lens or a liquid crystal element, and a photodetector 109.

The photodetector 109 has plural photodetecting cells as divided portions thereof, for example four photodetecting cell portions. The photodetector 109 performs the optoelectronic conversion to detect position error of the optical spot where light beam is condensed on the information recording surface with respect to a target position of the optical spot. The position error can be classified into various types such as a focus position error that indicates a shift in focal point with respect to the information recording surface, a track position error that indicates positional displacement of the optical spot with respect to a target track or to an information pit in a radial direction of the disk, and a tilt error that indicates a shift in inclination of the disk surface with respect to an optical axis of the objective lens 105.

The operation amplifying circuit 111 amplifies a signal supplied from the photodetector 109 to detect various types of position errors.

The positioning unit 112 positions the optical head 110 on a target track on the optical disk 101. The relative displacement calculator 113 counts a track position error signal to obtain a number of information tracks across which the optical head moves. The reference speed generator 114 calculates a movement speed required for the optical head to move to the target track by referring to the number of information tracks. The speed detector 115 divides an interval between the information tracks by a time interval of a rising pulse of the track position error signal, to detect a movement speed of the optical head at the time the optical head passes each track.

The comparison circuit 133 compares the movement speed to the target track generated by the reference speed generator 114, and the movement speed detected by the speed detector 115. The amplifier 116 amplifies the difference between the speeds examined by the comparison circuit 133.

The compensation controllers 120, 129 calculate an amount of control operation corresponding to various types of position errors so that the optical spot is formed appropriately on the information recording layers 103, 104 of the optical disk 101.

The coarse position controller 117 drive controls the positioning unit 112 according to the amount of control operation calculated by the compensation controller 120, to appropriately form the optical spot on the target track on the optical disk 101.

The access controller 118 cooperates with the compensation controller 120 and the coarse position controller 117 to control the positioning unit 112 that realizes the access to the target track. The position error detector 119 detects various types of position errors as described above from the signal supplied from the operation amplifying circuit 111. The encoder 121 detects a radial position of the optical head 110 on the optical disk 101.

The focus controller 122 controls the displacement of the objective lens 105 so that the laser beam is focused on the information recording layer 103, 104 of the optical disk 101 to form the optical spot.

The fine position controller 123 drive controls the lens driver 106 according to the amount of control operation calculated by the compensation controller 120 so that the optical spot is formed appropriately on the target track of the optical disk 101.

The tilt controller 124 drive controls the lens driver 106 according to the amount of control operation calculated by the compensation controller 129 so that the optical spot is formed appropriately on the target track of the optical disk 101.

The system controller 125 controls information recording and reproduction on the optical disk 101 by the optical disk apparatus 100.

The encoder 126 detects an angular velocity signal of the optical disk 101. The spindle motor rotation controller 127 detects an angular velocity of the spindle motor 102 via the encoder 126 to control the rotation of the spindle motor 102 according to the result of detection.

The tilt signal detector 128 detects a tilt error signal from the track position error signal detected by the position error detector 119. The tilt detection correcting unit 132 corrects the tilt error signal detected by the tilt signal detector 128. The tilt compensation amount storage unit 130 stores the corrected tilt error signal obtained through the processing by the tilt detection correcting unit 132.

The center deviation state determining unit 131 determines the state of center deviation of the optical disk 101 based on a rotation synchronization signal supplied from the spindle motor rotation controller 127.

In the optical disk apparatus 100 according to the first embodiment shown in FIG. 1, for the recording and the reproduction of the information on an information recording layer which is the same as the information recording layer on which the optical spot is formed, an access must be allowed to a predetermined position in the data area of the optical disk 101. An overview of a manner of accessing a predetermined position in the data area of the optical disk 101, i.e., an access sequence, is described below.

First, the track position control performed based on the track position error signal detected by the position error detector 119 is temporarily activated by the access controller 118 to start the access operation. When the track position control is activated and the amount of control operation is supplied as an input to one of the positioning unit 112 and the lens driver 106 from one of the coarse position controller 117 and the fine position controller 123, the optical spot starts moving in a radial direction of the optical disk 101 towards a track which is an access target. The movement of the optical spot causes generation of the track position error signal which serves to control the access operation.

The access controller 118 can find out the number of information tracks over which the optical spot moves to access the target track by counting up a digitized version of the track position error signal digitized by the relative displacement calculator 113. The access controller 118 calculates the number of tracks (target access number) in advance across which the optical spot moves to reach the target track, based on an address of an information track (target track) which is a target of the access and an address of an information track (current track) from which the access operation starts. The number of tracks across which the optical spot has already moved is subtracted from the target access number (number of tracks to be passed over for the access) and the number of remaining tracks is obtained. The access controller 118 looks up to thus calculated number of remaining tracks and the reference speed generator 114 generates a target movement speed.

On the other hand, when the interval between the information tracks is divided by the time interval of the rising pulse of the digitized version of the track position error signal, the speed detector 115 detects the movement speed of the optical head each time the optical head passes a track. The detected movement speed and the target movement speed mentioned above are compared by the comparison circuit 133 so as to make the detected movement speed follow the target movement speed. The difference between the movement speed and the target movement speed is amplified as appropriate by the amplifier 116, and supplied as an input to the coarse position controller 117. Further, based on the positional relation between the target track and the optical spot, the difference may be supplied to the fine position controller 123 via the access controller 118 to drive the lens driver 106.

When the optical spot reaches immediately in front of the target track, the access controller 118 disables a position control system again (to turn on the tracking servo), and the compensation controller 120 calculates the amount of control operation to drive the lens driver 106 so as to eliminate the track position error, and the calculated amount of control operation is supplied to the fine position controller 123. Thereafter, an address of the actually reached track is read out by a signal processing system of the system controller 125. If the read-out address is substantially the same as the address of the target information track, the access operation ends.

Next, an overview of a manner of detecting the tilt error signal and a method of tilt control in the optical disk apparatus 100 according to the first embodiment shown in FIG. 1 will be described.

The optical disk 101 is rotated by the spindle motor 102. The spindle motor rotation controller 127 controls the rotation of the optical disk to maintain the number of rotation of the optical disk 101 at a predetermined number based on the angular velocity signal detected by the encoder 126. A reproduction light beam is obtained from the optical disk in the above described state via the objective lens 105 which is under the focusing control of the focus controller 122. The reproduction light beam is incident on the photodetetor 109, and the operation amplifying circuit 111, and comes into the position error detector 119.

The position error detector 119 detects the focusing error and the track error. Values of the detected position errors are supplied to the compensation controller 120 at discrete time intervals, e.g., at sampling intervals of 200 kilohertz (kHz). The compensation controller 120 compensates the phase of the signal based on the focusing error and supplies the result to the focus controller 122. The track position error signal thus obtained is supplied into the center deviation state determining unit 131. When the optical disk 101 is found to be attached to the spindle motor in an off-center state, the tilt signal detector 128 acquires the track position error signal of a cycle corresponding to one rotation of the optical disk. When the number of disk rotations is approximately 20 Hz, for example, the track position error signal is sampled at 200 kHz, resulting in an extraction of 10000 samples.

The track position error signal thus obtained is subjected to a filtering such as Low Pass Filtering (LPF) for noise removal. Then, a maximum value and a minimum value of the track position error signal, and an intermediate value thereof are found. The intermediate value is employed as an offset signal and converted into a correct tilt error signal by the tilt detection correcting unit 132. The correct tilt error signal is supplied to the compensation controller 129 and subjected to phase compensation and gain amplification. The resulting signal is supplied to the tilt controller 124. Thus, tilt servo is applied so that the intermediate value attains zero. The control bandwidth here is approximately 2 Hz, since the interval of acquisition of the tilt error signal is 20 Hz when the cycle of disk rotation is 20 Hz. Hence, the tilt control realized through the above-described process is a low bandwidth control where the control bandwidth is equal to or less than approximately one tenth of the rotation frequency.

The tilt operation amount is thus supplied to the tilt controller 124, and then to a tilt compensation coil (not shown) of the lens driver 106, to incline the objective lens 105 in a direction of the radial tilt rotation.

Figure 5:
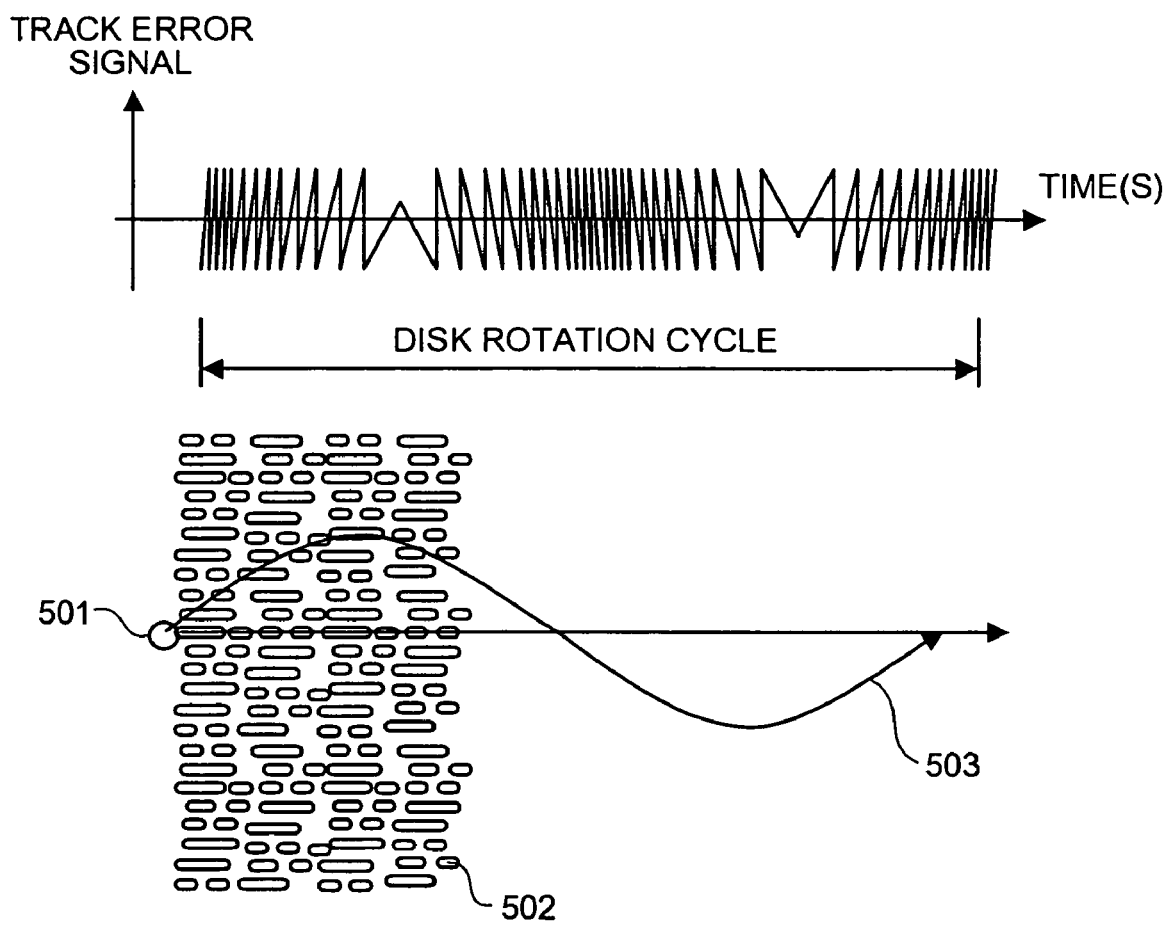
FIG. 5 is an explanatory diagram of an example of a differential phase track error signal detected according to a center deviation of the optical disk.

FIG. 5 is an explanatory diagram of an example of the differential phase track error signal which is detected while the optical spot 501 traces the information pit 502 in the data area when the center of the optical disk 101 is deviated in the optical disk apparatus 100 according to the first embodiment. Here, the differential phase track error signal is a track position error signal obtained based on the phase difference of the signals according to a DPD technique described later, for example.

Shown in a lower portion of FIG. 5 is a relative displacement trace 503 of the optical spot 501 relative to the information pit 502 caused by the center deviation of the optical disk 101. Further, in an upper portion of FIG. 5, a waveform then observed is shown.

When the optical disk 101 is rotated by the spindle motor 102 while the optical spot 501 is focused on the information recording surface of the optical disk 101, the track position error signal obtained by the position error detector 119 exhibits a waveform as shown in the upper portion of FIG. 5. Such a waveform is generated due to the influence of the center deviation of the disk caused at the attachment of the optical disk 101 to the spindle motor 102.

The lower portion of FIG. 5 is a schematic diagram of the relative displacement trace 503 of the optical spot 501 relative to the optical disk 101. Due to the influence of the center deviation of the optical disk 101, the displacement of the optical spot 501 from the optical disk 101 cyclically changes. As a result, the obtained differential phase track error signal becomes a cyclical signal that cyclically changes according to the rotation cycle of the optical disk 101 as shown in FIG. 5.

FIG. 6A shows a differential phase track error signal which can be detected when the optical disk 101 is inclined toward the objective lens 105 by +0.8 degrees. FIG. 6B shows a differential phase track error signal which can be detected when the optical disk 101 is not inclined toward the objective lens 105. FIG. 6C shows a differential phase track error signal which can be detected when the optical disk 101 is inclined toward the objective lens 105 by −0.8 degrees.

As can be seen in FIGS. 6A and 6C, when the optical disk 101 is inclined toward an optical axis of the objective lens 105, the amplitude of the differential phase track error signal varies so that the differential phase track error signal is observed as a signal whose waveform has an offset center value as can be seen in graphs shown in FIGS. 6A and 6C.

Figure 7A:
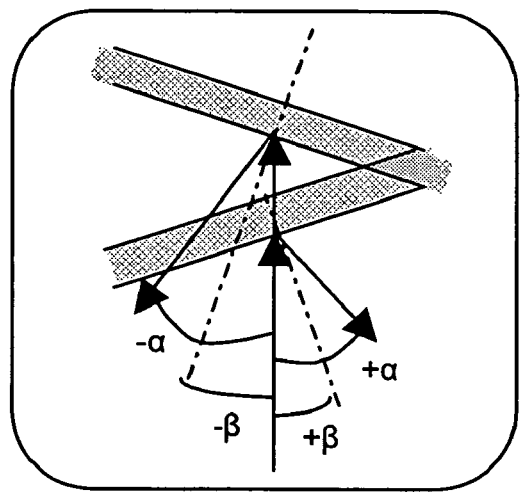
FIGS. 7A and 7B show a correlation between the tilt of the optical disk and a center value of the differential phase track error signal.
Figure 7B:
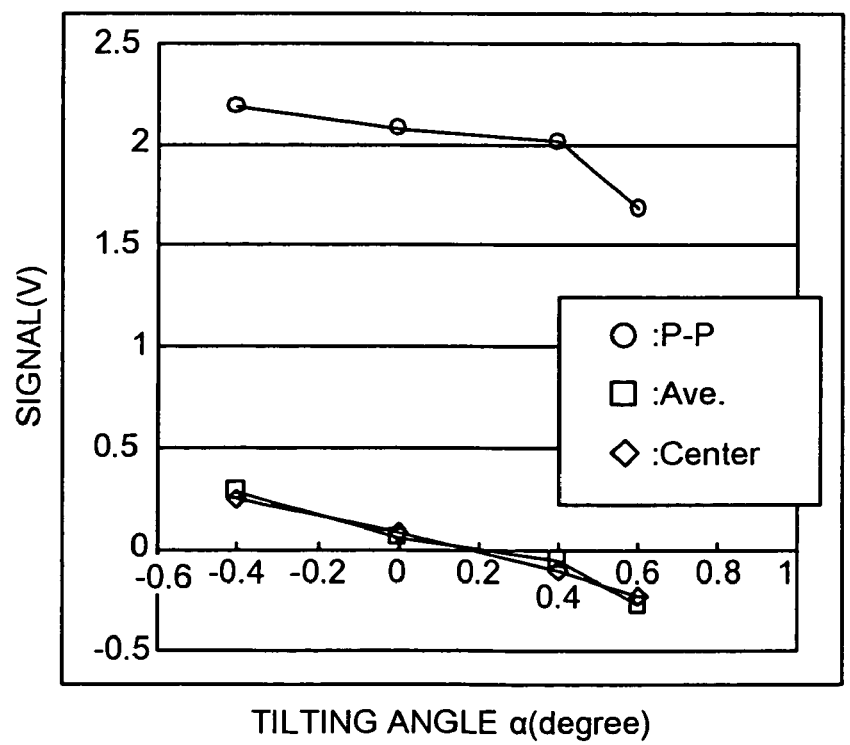

FIGS. 7A and 7B show a correlation between the inclination of the optical disk 101 and the center value of the differential phase track error signal. As shown in FIG. 7A, when the surface of the optical disk 101 is inclined toward the optical axis of the objective lens 105 by ±α degree(s), a signal level of the differential phase track error signal changes correspondingly to the magnitude of the tilting angle α as shown in FIG. 7B. Such signal variation can be observed similarly in the peak-to-peak value, the average value, or the center value of the signal.

FIGS. 8A to 8D show waveforms of the differential phase track error signals detected at various amounts (α=−0.4, 0.0, 0.4, and 0.8) of inclination of the optical disk 101. FIGS. 8A to 8D show the results of experiment in which a relation between the differential phase track error signal and the inclination of the optical disk 101 is examined under conditions that a numerical aperture (NA) of the objective lens 105 is 0.65, a distance from the surface of the optical disk 101 to the information recording surface is 0.6 millimeter (mm), and a wavelength (λ) of the laser beam is approximately 400 nm. A graph in FIG. 7B mentioned above shows a relation between the center value of the differential phase track error signal and the inclination of the optical disk 101 obtained as a result of the experiment.

Figure 8A:
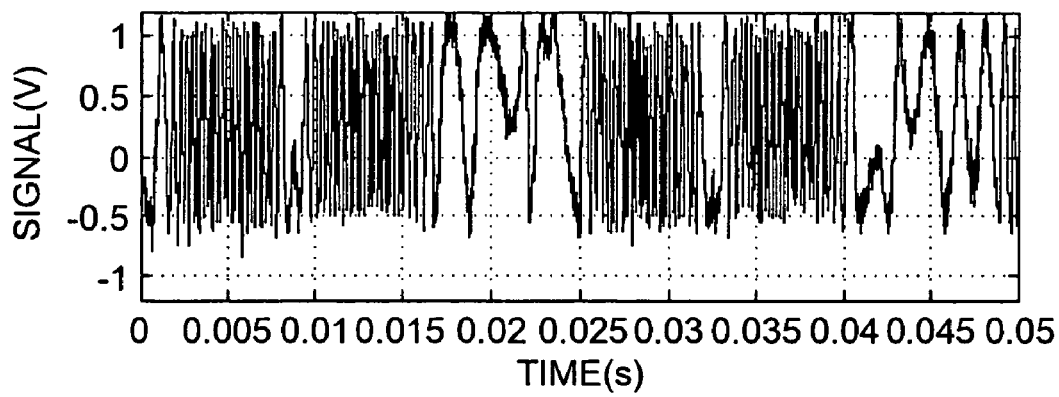
FIGS. 8A to 8D show waveforms of the differential phase track error signals detected at various amounts ($\alpha$=−0.4, 0.0, 0.4, and 0.8) of inclination of the optical disk.
Figure 8B:
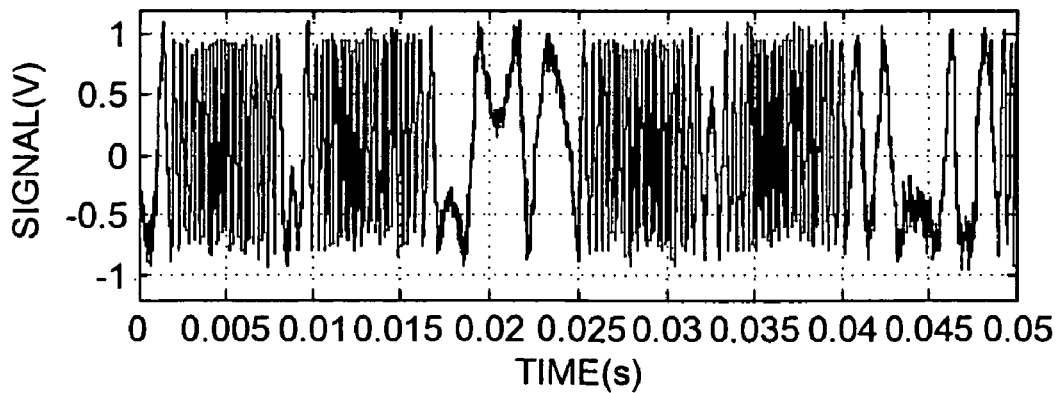
Figure 8C:
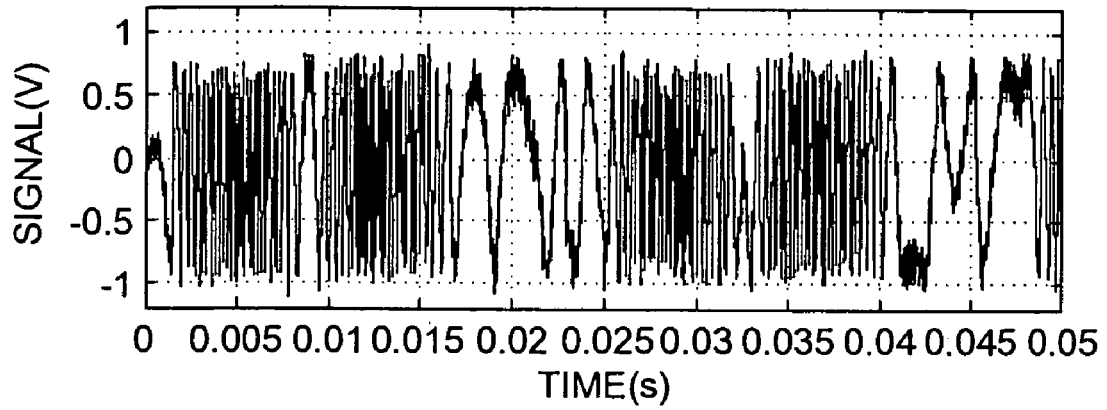
Figure 8D:
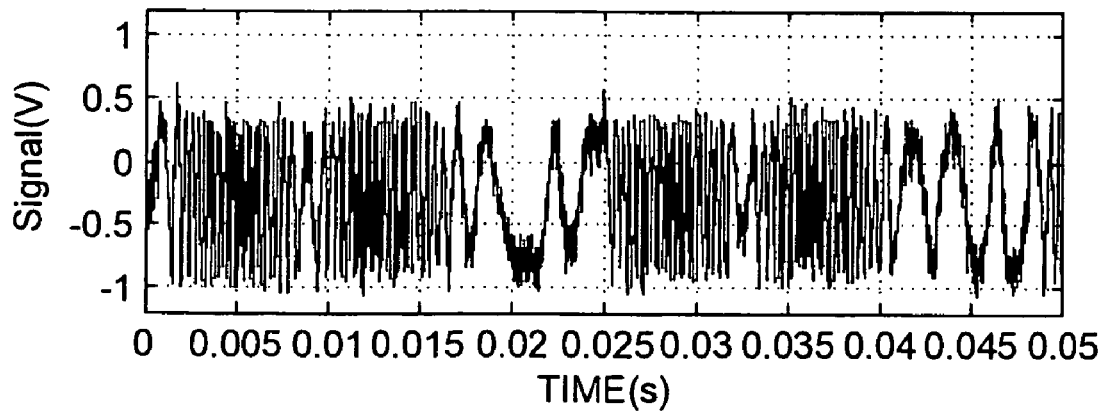

As shown in the graph in FIG. 7B, the center value of the differential phase track error signal clearly varies according to the tilting angle α even when the angle α takes a relatively small value equal to or less than 0.4. Further, as shown in FIG. 8D, the amplitude of the differential phase track error signal decreases when the tilting angle α is large (α=0.8).

In other words, when the change in the tilt amount is larger than a predetermined value, the amplitude as well as the center value of the differential phase track error signal changes. Then, if the differential phase track error signal is corrected so as to eliminate the amplitude variation, followed by the extraction of the center value thereof, an actual tilt amount can be more precisely known. Hence, desirably the amplitude of the differential phase track error signal is normalized based on a reference tilting angle α=0, before calculation of the center value. Through such processing, more accurate amount of tilt compensation can be found.

FIG. 9 is an explanatory diagram of an example of the differential phase track error signal detected according to the phase difference found in the photodetector 109 which is a quadrant photodetector, when the optical spot 501 is positioned on the track.

When the optical spot 501 passes through the center of the information pit 502, distribution of intensity of light reflected back to the photodetector 109 is symmetrical as shown in a central portion of FIG. 9. When the optical spot 501 passes through the information pit 502 off from the center, the distribution of intensity of the light reflected back to the diagonally arranged photodetectors 109A to 109D become asymmetrical as shown in a left and a right portions of FIG. 9. With the use of such characteristic of the distribution of light intensity, the differential phase track error signal can be detected.

More specifically, the differential phase track error signal can be detected according to the DPD technique. According to the DPD technique, signals obtained from the diagonally arranged photodetectors 109A to 109D are added, and phases of thus obtained two signals are compared. Thus found phase difference is employed as the differential phase track error signal.

Figure 10:
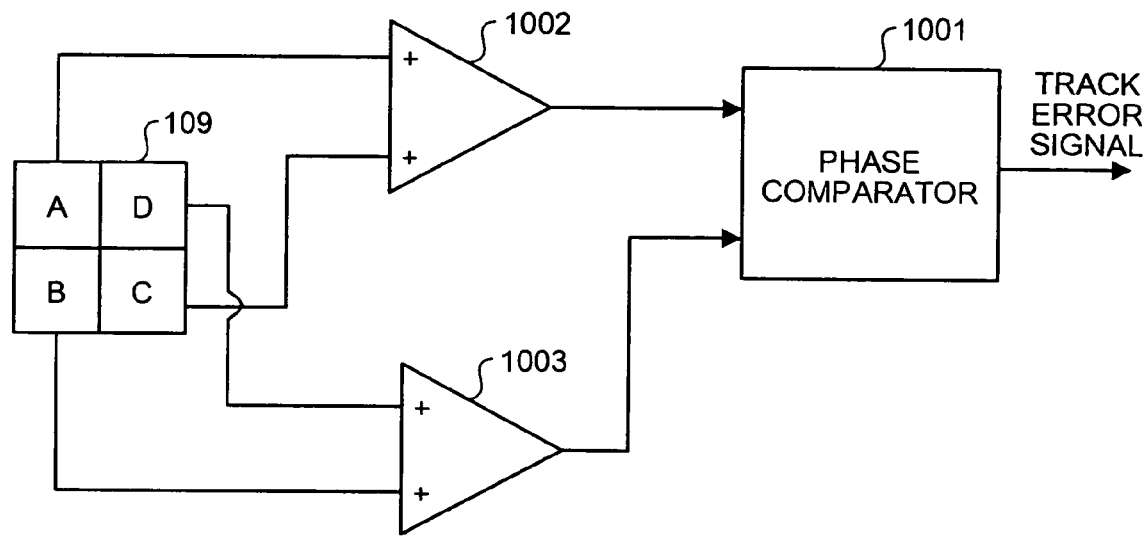
FIG. 10 is an explanatory diagram of an example of a structure of a detecting circuit of the differential phase track error signal.

FIG. 10 is an explanatory diagram of an exemplary structure of a detecting circuit for the differential phase track error signal. The DPD signal can be processed by a processing circuit as shown in FIG. 10. In such a circuit, a signal obtained by addition of signals detected by the diagonally arranged photodetectors 109A and 109C by an adder 1002, and a signal obtained by addition of signals detected by the diagonally arranged photodetectors 109B and 109D by an adder 1003 are compared in phase by a phase comparator 1001. A result of the phase comparison is supplied as the differential phase track error signal as an output of the processing circuit.

Figure 11:
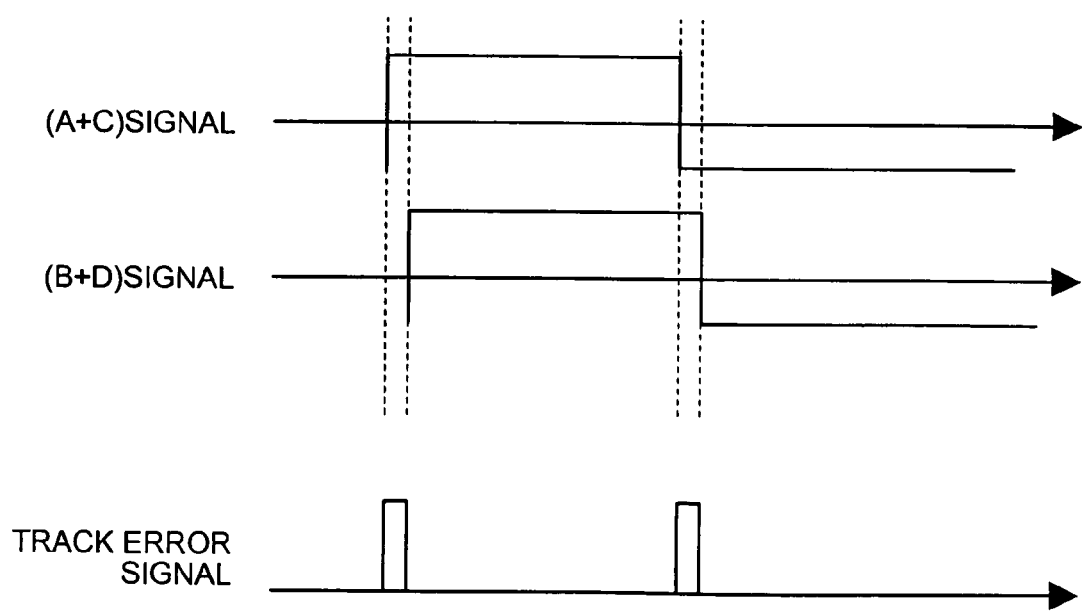
FIG. 11 is an explanatory diagram of an example of the differential phase track error signal.

FIG. 11 is an explanatory diagram of an example of the differential phase track error signal detected by the detecting circuit shown in FIG. 10. As shown in FIG. 11, there is a phase difference between the signal obtained as an addition of signals detected by the diagonally arranged photodetectors 109A and 109C, and a signal obtained as an addition of signals detected by the diagonally arranged photodetectors 109B and 109D. When such phase difference is processed by a circuit that charges a capacitor for detection (i.e., so-called charge pump circuit), for example, the differential phase track error signal can be obtained.

Figure 12:
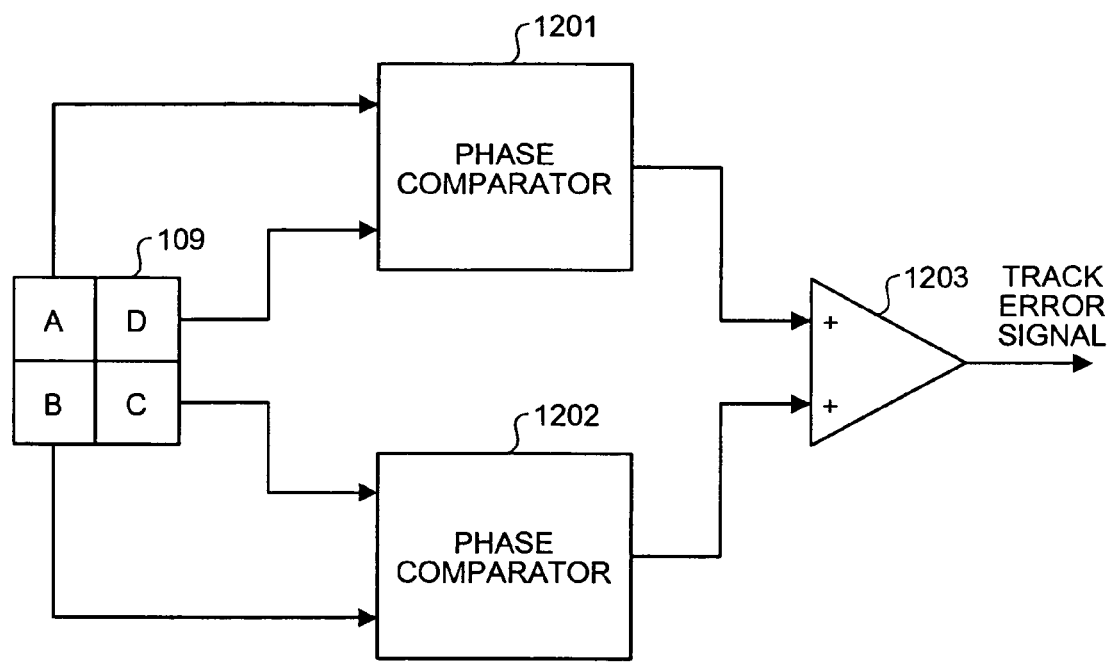
FIG. 12 is an explanatory diagram of another example of a structure of the detecting circuit of the differential phase track error signal.

FIG. 12 is an explanatory diagram of another exemplary structure of the detecting circuit of the differential phase track error signal. In the detecting circuit shown in FIG. 12, signals detected by the diagonally arranged elements of the photodetector 109 are not added. Instead, the detected signals on the adjacent photodetectors (109A & 109D, 109B & 109C) are compared in phase by one of phase comparators 1201, 1202, and the results of comparison are added by an adder 1203 to realize the detection of the differential phase track error signal.

Figure 13:
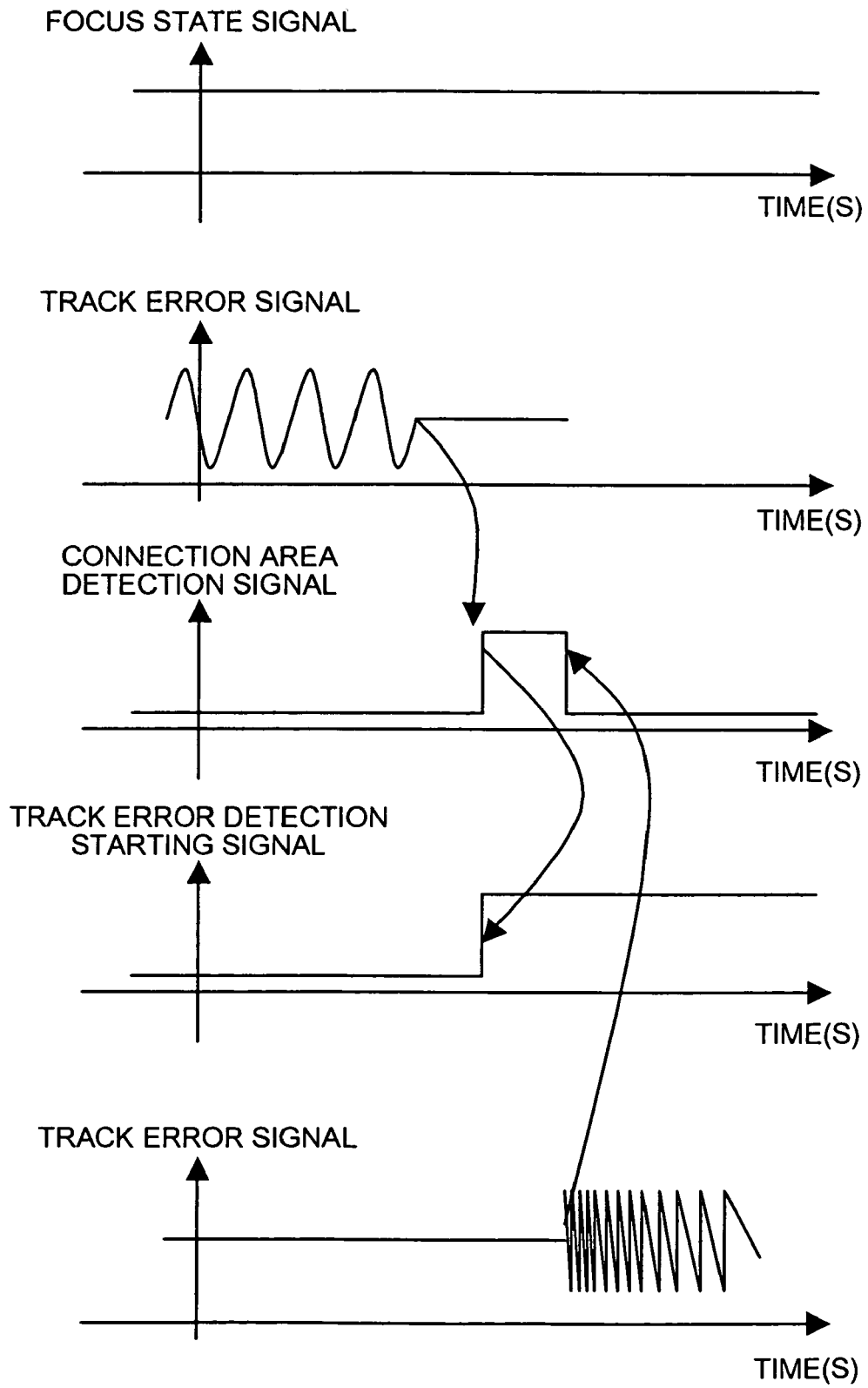
FIG. 13 is an explanatory diagram of an example of signal transition in a process of access to a system read-in area.

FIG. 13 is an explanatory diagram of an example of a transition of a signal such as the differential phase track error signal during the access to the system read-in area of the optical disk 101.

In FIG. 13, a signal detected in a focus state, the track position error signal detected according to the push-pull technique in the data area, a signal detected in the connection area, a signal for switching the detection of the track position error signal to the DPD technique, the track position error signal detected according to the DPD technique in the system read-in area (differential phase track error signal) are shown from the top to the bottom.

Next, an overview of the detection of the track position error signal in the system read-in area will be described below.

First, when the optical disk 101 is rotated by the spindle motor 102, the positioning unit 112 moves the optical head 110 toward the direction of the inner periphery, so that the optical head 110 reaches a possible innermost peripheral position. At this position, the lens driver 106 that holds the objective lens 105 on the optical head 110 is displaced in a direction perpendicular to the surface of the optical disk 101 so that the optical spot where the laser beam is condensed by the objective lens 105 is focused on the information recording surface of the optical disk 101. The control of the above-described operation is realized by the focus controller 122.

Then, the optical head 110 is displaced through the above mentioned access sequence so that the optical spot is formed in an innermost periphery of the data area. After the displacement of the optical spot to the innermost peripheral track in the data area, the position control is activated and the positioning unit 112 or the lens driver 106 is driven to move the objective lens 105 further towards inner periphery. When the focus control is maintained during the displacement, a connection area detection signal as shown in a central portion of FIG. 13 is obtained, and the connection area between the data area and the system read-in area can be distinguished. Thus, the optical head 110 is displaced and the optical spot reaches the system read-in area arranged in the vicinity of the innermost periphery of the optical disk 101.

When the optical spot reaches the system read-in area, a signal processing circuit (not shown) that processes the light reflected from the optical spot reproduces the information in the system read-in area. In the signal processing circuit, a servo signal processing circuit (not shown) receives the reflected light from the optical spot by a quadrant photodetector (a part of the photodetector 109), processes respective signal outputs from four divided portions of the quadrant photodetector by the position error detector 119, and detects the track position error signal for tracking servo.

Figure 14:
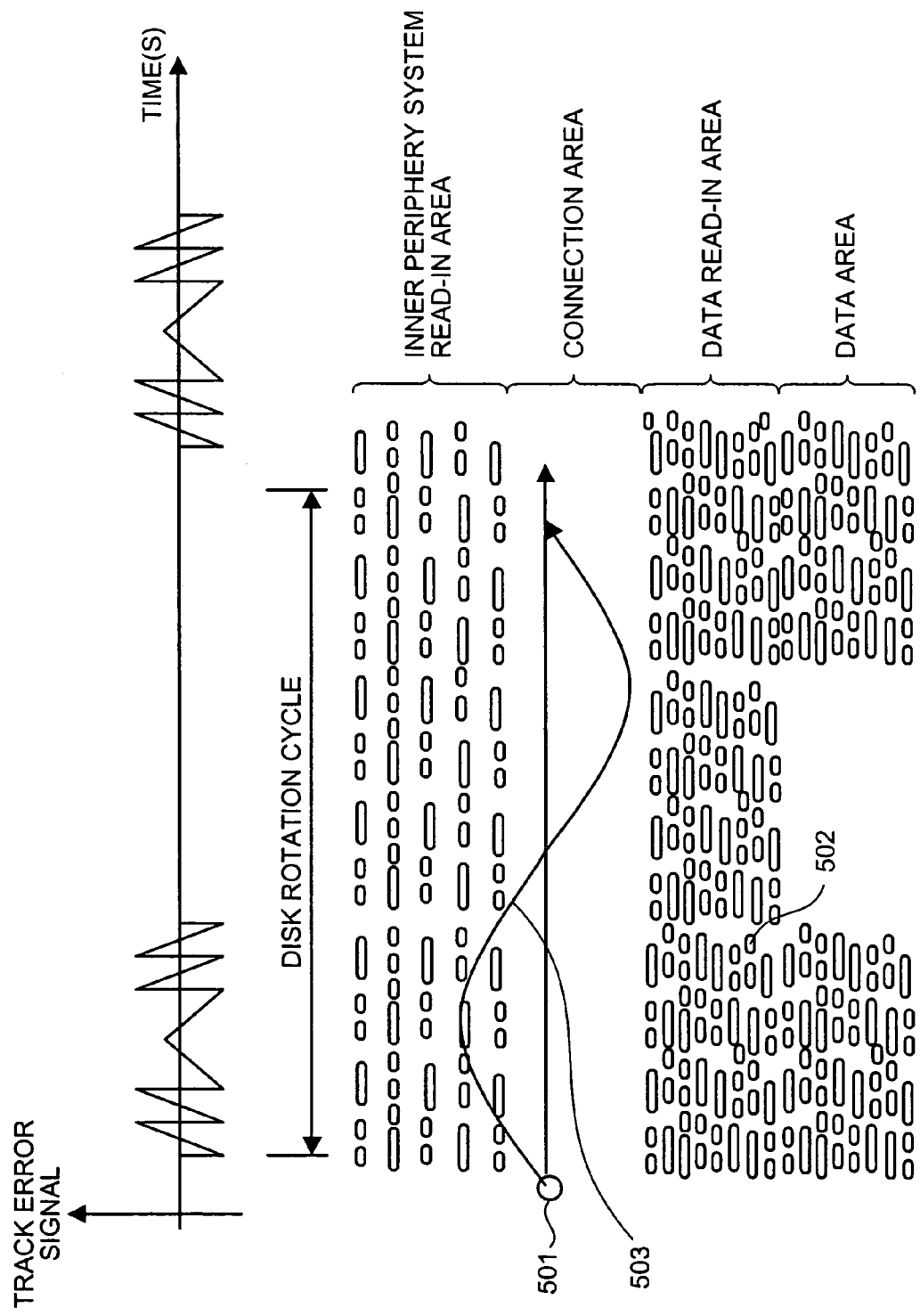
FIG. 14 is an explanatory diagram of another example of the differential phase track error signal detected according to center deviation of the optical disk.

FIG. 14 is an explanatory diagram of another example of the differential phase track error signal detected according to the center deviation of the optical disk 101. A graph in an upper portion of FIG. 14 shows the differential phase track error signal detected when the optical spot 501 traces outside the data area.

When the optical head 110 reaches a radial position where the system read-in area of the optical disk 101 resides, the optical head 110 stays at the position for one rotation cycle of the optical disk 101. When the optical disk 101 is mounted on the optical disk apparatus 100 in an off-center state, the passing of the optical spot 501 through the system read-in area generates the differential phase track error signal detected by the position error detector 119 as shown in a graph in an upper portion of FIG. 14. The differential phase track error signal is generated even when the optical spot 501 passes through the system read-in area only for a portion of the rotation cycle of the disk. Such signal may be sufficient as far as the center value can be obtained. The differential phase track error signal as shown in the graph of the upper portion of FIG. 14 can be sampled by the tilt signal detector 128, and an offset amount can be found from a maximum value and a minimum value thereof. Then, the offset amount can be employed as the tilt error signal to realize the tilt control.

Figure 15:
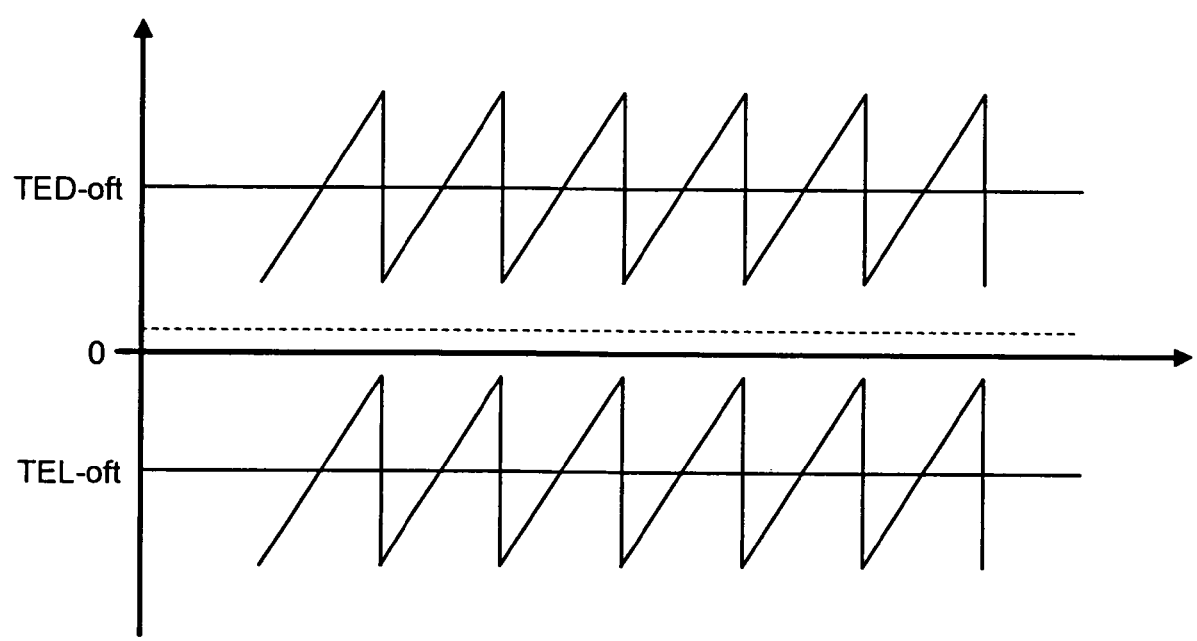
FIG. 15 is a schematic diagram of an example of a track position error signal.

FIG. 15 is a schematic diagram of a difference between the track position error signal detected in the system read-in area and the track position error signal detected in the data area. A waveform shown in a lower portion of FIG. 15 represents the track position error signal detected in the system read-in area, whereas a waveform shown in an upper portion of FIG. 15 represents the track position error signal detected in the data area. As shown in FIG. 15, offset amounts $TEL_{oft}$ and $TED_{oft}$ of the center values of the respective track position error signals have different polarities. The optical disk apparatus 100 according to the first embodiment utilizes the difference in polarity of the track position error signals to calculate the tilt error amount. The calculation of the tilt error amount will be described later in detail.

The amplitude of the track position error signal detected in the system read-in area is different from the amplitude of the track position error signal detected in the data area. Hence, for the accurate detection of the offset amount, the amplitude values of the respective track position error signals are desirably normalized for the acquisition of the accurate offset amounts.

Further, the track position error signal may be detected by the DPD technique, or by the push-pull technique as far as a necessary signal to noise ratio (S/N) is secured. The detection of the tilt error signal may be realized through an acquisition of a PV (Peak-to-peak Voltage) center value or an average value of the track position error signal.

Figure 16:
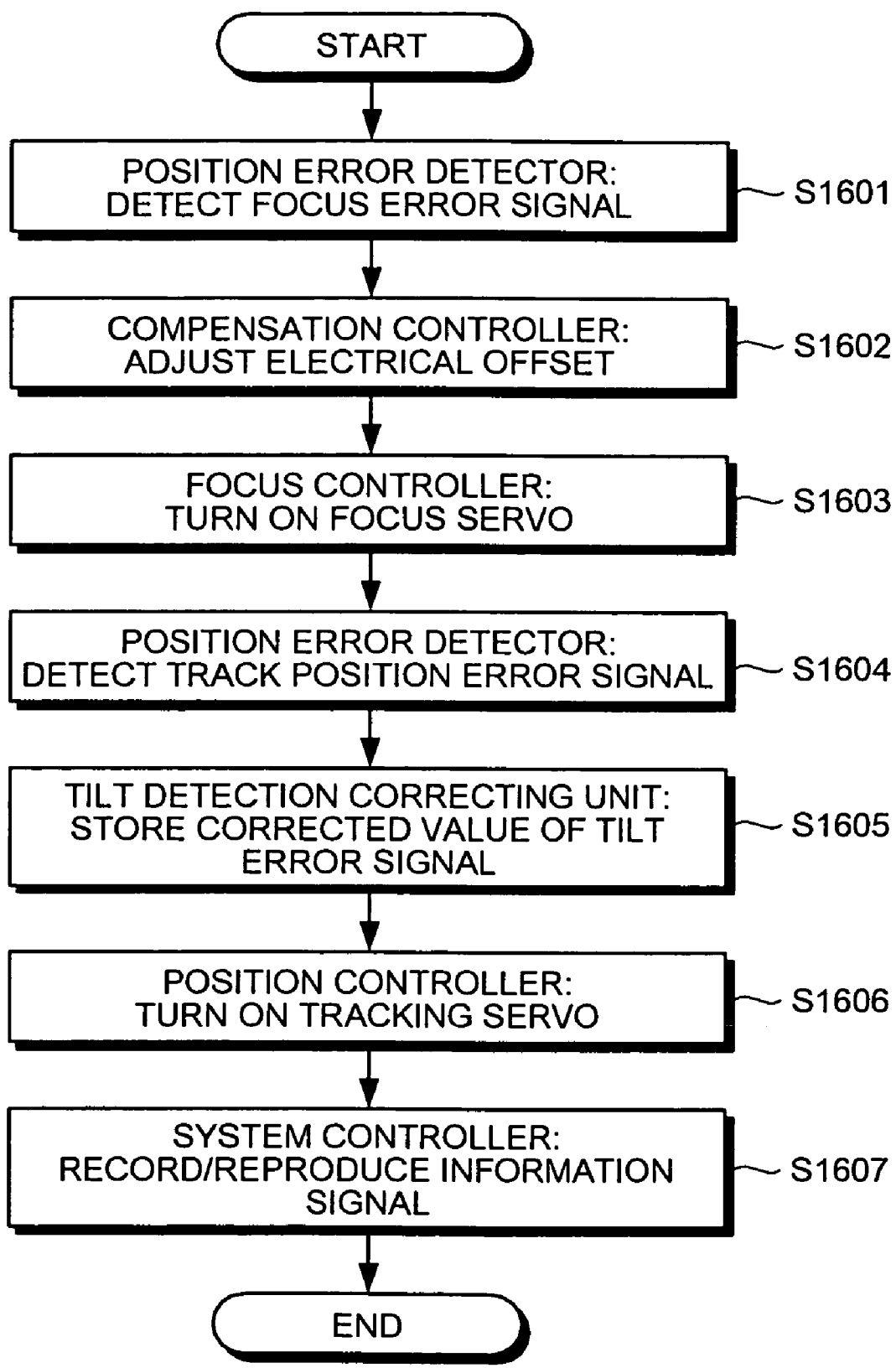
FIG. 16 is a flowchart of recording and reproduction of information to and from a system read-in area in the optical disk apparatus according to the first embodiment.

Next, the recording and the reproduction of information by the optical disk apparatus 100 according to the first embodiment with the above-described structure will be described. FIG. 16 is a flowchart of an overall process sequence of the information recording and reproduction in the system read-in area.

First, the system controller 125 sends a request to access the system read-in area. Then the position error detector 119 detects the focus error signal (step S1601) and the compensation controller 120 adjusts an electrical offset of the detected signal (step S1602). Thereafter, the focus controller 122 turns ON the focus servo according to the amount of control operation calculated by the compensation controller 120 to realize the focus control (step S1603).

Then, the position error detector 119 detects the track position error signal (step S1604). The tilt detection correcting unit 132 stores the offset amount of the track position error signal in the system read-in area detected by the position error detector 119 in the tilt compensation amount storage unit 130 as a corrected value of the tilt error signal (step S1605). The stored corrected value of the tilt error signal is referenced in the correction of the tilt error signal described later.

Thereafter, the coarse position controller 117 and the fine position controller 123 turn ON the tracking servo to realize the tracking (alignment) control (step S1606). When the tracking becomes stable, the recording or the reproduction of information signals to or from the system read-in area is performed (step S1607).

Here, in the optical disk apparatus 100 according to the first embodiment, whether the optical head reaches the system read-in area or not may be determined according to the conventionally employed technique. For example, a radial position may be examined, or a history of movement of the optical spot is looked up to.

Figure 17:
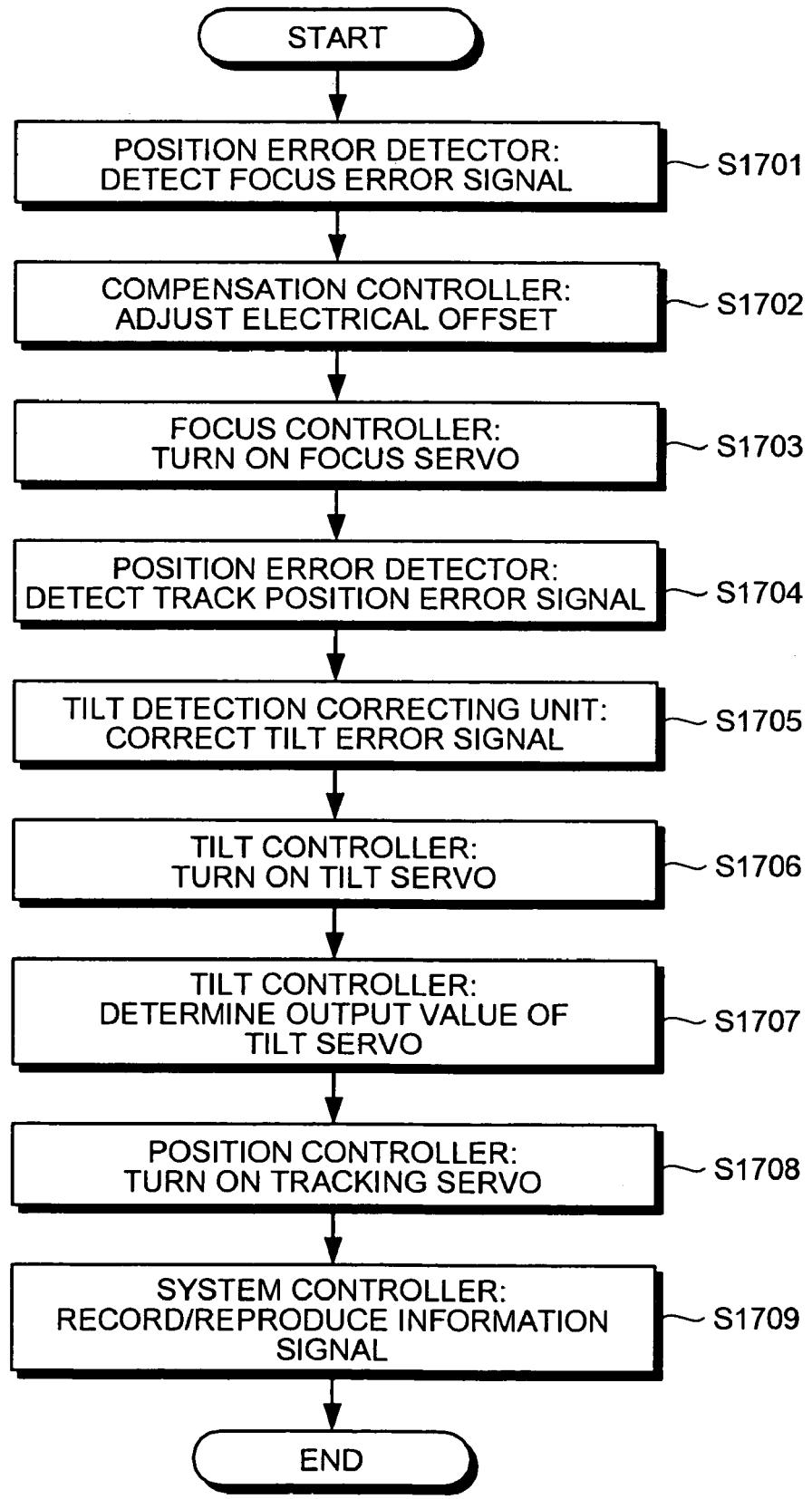
FIG. 17 is a flowchart of recording and reproduction of information to and from a data area in the optical disk apparatus according to the first embodiment.

FIG. 17 is a flowchart of an overall process sequence of the recording and the reproduction of information in the data area.

First, the system controller 125 sends a request to access the data area. Then the position error detector 119 detects the focus error signal (step S1701), and the compensation controller 120 adjusts an electrical offset of the detected signal (step S1702). Thereafter, the focus controller 122 turns ON the focus servo according to the amount of control operation calculated by the compensation controller 120 to realize the focus control (Step S1703).

Then, the position error detector 119 detects the track position error signal (step S1704). After the position error detector 119 detects the track position error signal, the tilt detection correcting unit 132 corrects the tilt error signal (step S1705), to start the tilt servo by the tilt controller 124 (step S1706) thereby determining the value of tilt servo output (step S1707). The correction of the tilt error signal and the tilt control will be described in detail with reference to the flowchart of FIG. 18 described later.

After the tilt servo output is determined, the coarse position controller 117 and the fine position controller 123 turn ON the tracking servo thereby realizing the tracking control (alignment/positioning control) (step S1708). After the tracking becomes stable, the recording or the reproduction of the information signal in the data area is performed (step S1709).

Figure 18:
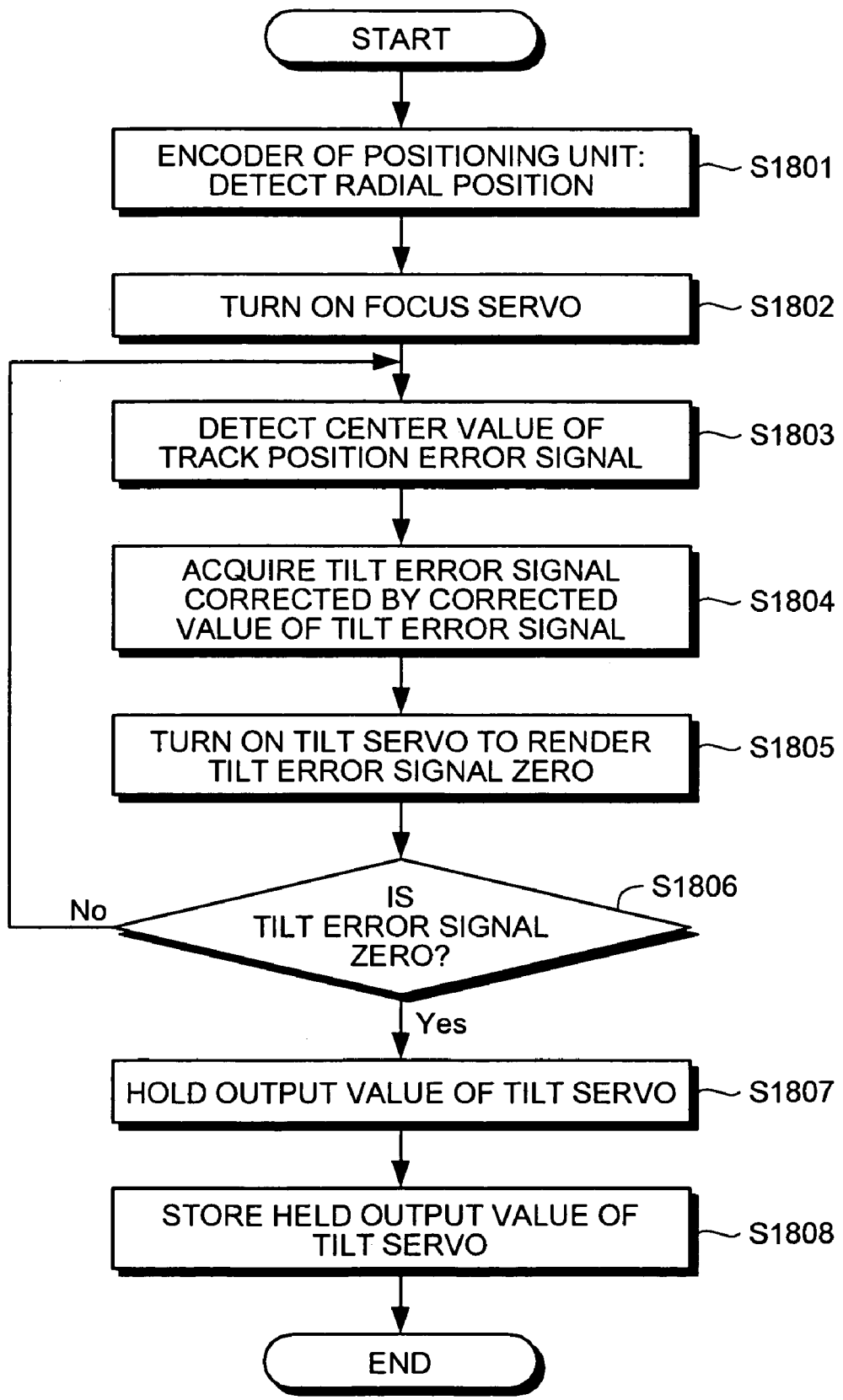
FIG. 18 is a flowchart of correction of a tilt error signal and tilt control in the optical disk apparatus according to the first embodiment.

FIG. 18 is a flowchart of a detailed process sequence of the correction of the tilt error signal and the tilt control.

First, the encoder 121 of the positioning unit 112 detects the radial position of the optical head 110 (step S1801). Thereafter, the focus controller 122 activates the focus servo (step S1802), and the center value of the track position error signal detected by the position error detector 119 is detected by the tilt signal detector 128 as the offset amount in the data area (step S1803).

A specific manner to find the offset amount is as follows. First, only the focus control is activated, and the samples of the track position error signal are taken for one disk rotation. The track position error signal is generated due to the influence of the center deviation of the optical disk. Then, the center value of the samples is found. Thus, an offset amount which has a high correlation with a relative amount of inclination of the optical disk 101 and the objective lens 105 can be obtained. More specifically, samples of the track position error signal are taken only for one cycle period of one rotation of the optical disk 101 and the maximum value and the minimum value of the sampled values are found. An intermediate value of the maximum and the minimum values is employed as the offset amount.

Then, with the use of the corrected value of the tilt error signal stored in the tilt compensation amount storage unit 130 at the access to the system read-in area, the tilt detection correcting unit 132 corrects the offset amount and sets the corrected value as the tilt error signal (step S1804).

Specifically, the value of the tilt error signal is calculated as described below. Here, the relation between the offset amount $TED_{oft}$ in the data area and the offset amount $TEL_{oft}$ in the system read-in area and the tilt error signal TiltErr can be represented by equations (1) and (2):

$$TED_{oft} = K1 \times TiltErr + \alpha \tag{1}$$

$$TEL_{oft} = K2 \times TiltErr + \alpha \tag{2}$$

Here, $\alpha$ is a collection of factors that influence the offset of the track position error signal other than the tilt error signal, and the value thereof is constant regardless of the area type, i.e., no matter whether it is the data area or the system read-in area. On the other hand, K1 and K2 are constants which are different from each other and a mutual gain relation thereof is known from the physical characteristic of the optical disk.

Figure 19:
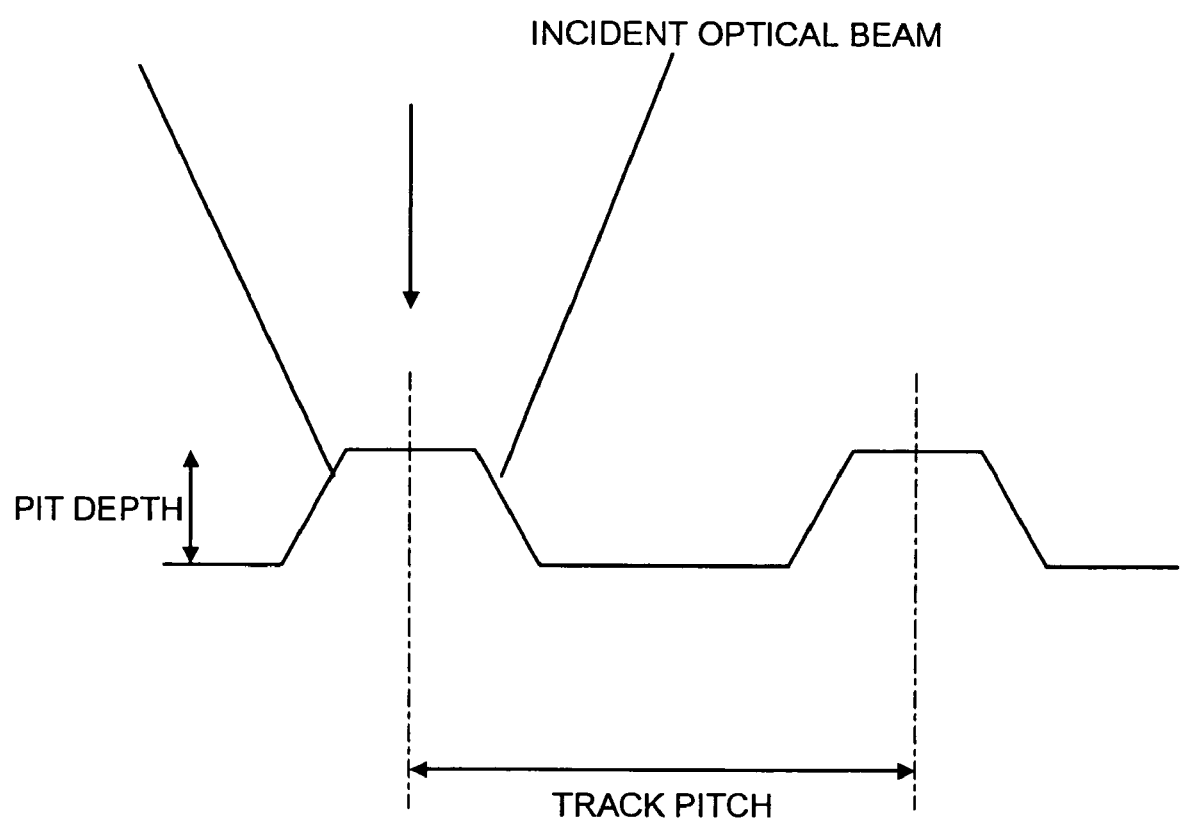
FIG. 19 is an explanatory diagram schematically showing a sectional shape of a pit of the optical disk.

Particularly, the signal in the system read-in area is generated from a line of pits that have the same depth with the pits in the data area and different track pitch from that in the data area. FIG. 19 is a schematic diagram of a sectional shape of the pits of the optical disk 101. As shown in FIG. 19, the pit sequence has various physical factors such as the pit depth and the track pitch. Generally, the pit depth is 70 to 80 nm in the pit sequence in the reproduction only disk, whereas the pit depth is 40 to 50 nm in the rewritable disk. The track pitch is 0.68 micrometer (μm) in the system read-in area in the reproduction only disk, whereas the track pitch is 0.4 μm in the data area.

Thus, the pit sequences have different track pitches on the same disk. Then, when the optical spot is formed with a wavelength of 405 nm and the numerical aperture (NA) of 0.65, and the track position error signal is detected by a circuit as shown in FIG. 10, the phase relation of the output signals from the adders 1002 and 1003 shown in FIG. 10 differs in areas with different track pitches.

Such difference is attributable to the difference in the influence from adjacent tracks. When the track pitch is wide, even when the optical head slightly shifts off the track, the leakage of the reflected signal from the pit of the adjacent track is relatively insignificant. Hence, a reflected signal from the pits of the target track alone can be detected. When the track pitch is narrow, the leakage of the reflected signal from the pit of the adjacent track increases at the track shift, and the resulting leakage is more significant so as to cause inversion of the phase relation.

The inversion of the phase relation is detected, for example, in the optical disk as described above where the track pitch in the system read-in area is 0.68 μm and the track pitch in the data area is 0.4 μm. The structure of the optical disk, however, is not limited to such an optical disk. Any optical disk with the track pitch combination in which the inversion of the phase relation occurs can be employed for the optical disk apparatus of the present invention.

FIGS. 20A to 20C and 21A to 21C are explanatory diagrams of the phase relation between the signals from the adders 1002 and 1003 at the detection of the track position error signal in the system read-in area and the data area, respectively. In FIGS. 20 and 21, outputs from the adders 1002 and 1003 at the disk inclination of −α, 0, and +α degree(s) are shown from the top to the bottom. In each diagrams, the vertical axis represents the output signal (signal phase) of the adders 1002 and 1003, and the horizontal axis represents the amount of shift of the optical spot relative to the track center.

Figure 20A:
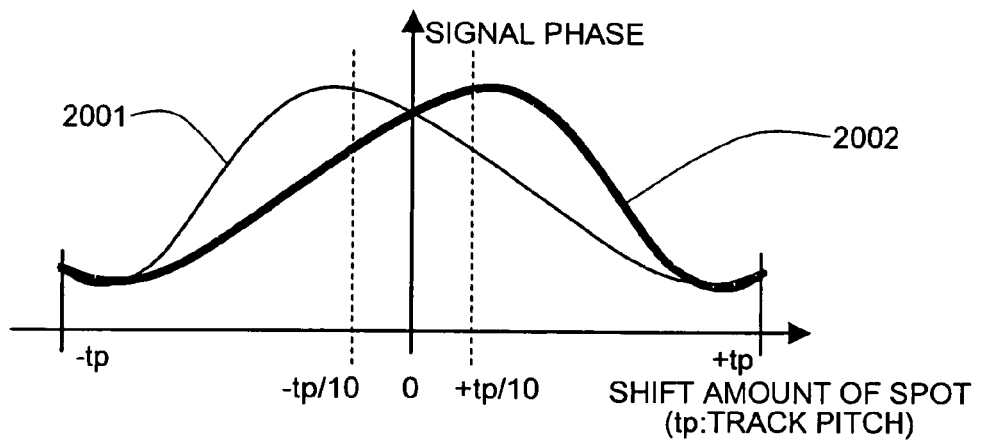
FIGS. 20A to 20C show phase s the signals of output from adders in the system read-in area at various disk inclinations (−$\alpha$, 0, +$\alpha$)
Figure 20B:
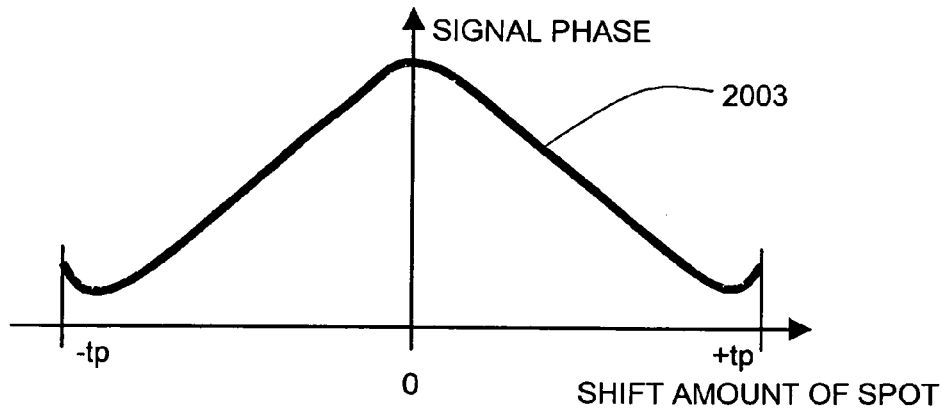
Figure 20C:
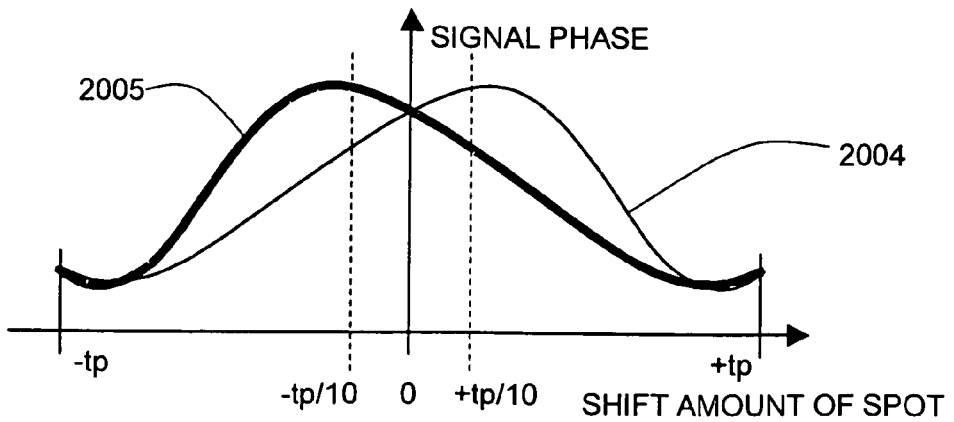

In FIGS. 20A to 20C, the output signal from the adder 1002 is shown by narrow lines as signals 2001 and 2004. The output signal from the adder 1003 is shown by bold lines as signals 2002, 2003, and 2005. When the disk inclination is 0 degrees, the output signal of the adder 1002 is the same as the output signal 2003 of the adder 1003.

Figure 21A:
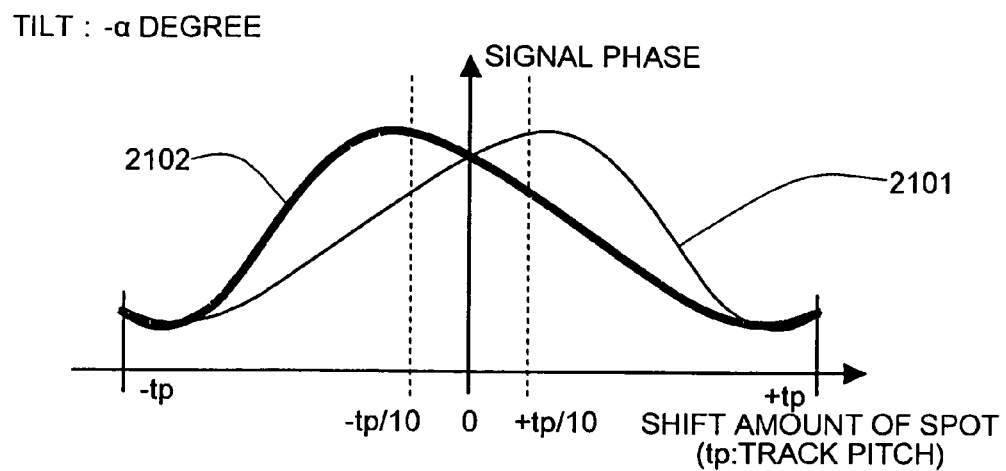
Figure 21B:
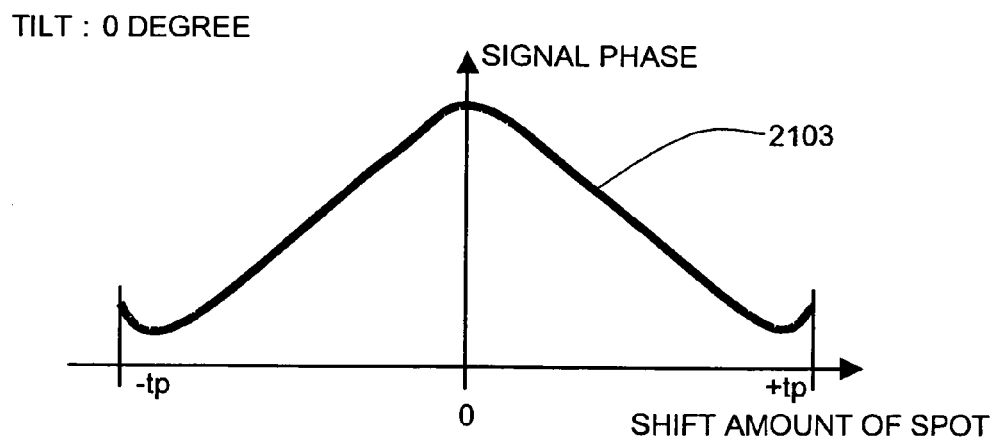
Figure 21C:
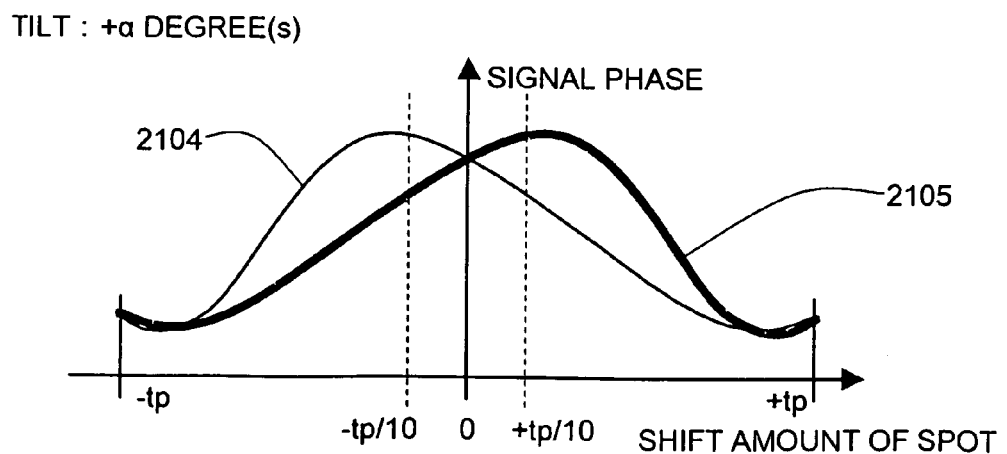

In FIGS. 21A to 21C, output signals 2101 and 2104 shown by narrow lines represent the output signal from the adder 1002. Output signals 2102, 2103, and 2105 shown by bold lines represent the output signal from the adder 1003. Here, when the disk inclination is 0 degrees, the output signal of the adder 1002 is the same as the output signal 2103 of the adder 1003.

As shown in FIGS. 20A to 20C and 21A to 21C, the intensity of the output signals from the adder 1002 and the adder 1003 corresponding to the shift amount of the optical spot is reverse in the system read-in area and in the data area. When the inclination is 0 degrees, even when the optical spot shifts from the track center, the output result of the adder 1002 is in the same phase as the phase of the output result of the adder 1003. Hence, only the original information of phase comparison of the differential phase track error signal detected according to the above mentioned DPD technique, for example, is processed and the correct track position error signal is obtained.

When there is a disk inclination, however, since the phase information of the output results of the adder 1003 and the adder 1002 depends on the inclination, the phase relation differs in one area from another in the same disk. For example, the phase relation in the system read-in area is reverse from the phase relation in the data area. This inversion means that the polarity of K1 is different from the polarity of K2, with reference to equations (1) and (2).

When only the focus control is performed as described above at the acquisition of the track position error signal, the track position error varies according to the state of center deviation. As a result, according to the phase relation, which depends on the state of inclination as shown in FIGS. 20A to 20C and 21A to 21C, the phase difference in the output results of the adders 1002 and 1003 are detected averagely as the offset amount.

According to equations (1) and (2), the tilt error signal TiltErr can be represented by equation (3):

$$\text{TiltErr} = (TED_{oft} - TEL_{oft})/(K1-K2) \quad (3)$$

The denominator (K1−K2), due to the difference in polarity, has a larger absolute value than a value obtained in the same polarity. Thus, the signal TiltErr can be calculated at high accuracy than when the denominator is small.

As the offset amount $TEL_{oft}$ in the system read-in area, the corrected value of the tilt error signal stored in the tilt compensation amount storage unit 130 at the access to the system read-in area is employed. Since K1 and K2 are known, the tilt error signal TiltErr can be calculated by substitution of the offset amount $TED_{oft}$ in the data area detected in step S1803 into equation (3).

Thus, with the use of the difference in polarity of the offset amount $TED_{oft}$ in the data area and the offset amount $TEL_{oft}$ in the system read-in area, the tilt error signal can be calculated at high accuracy and the factor α that influences the offset of the track position error signal other than the tilt error signal is eliminated.

Next, the tilt controller 124 starts the tilt servo so as to render the tilt error signal zero, and an operation amount is supplied to a tilt compensation coil (not shown) of the lens driver 106 (step S1805). The tilt controller 124 determines whether the tilt error signal is zero or not (step S1806). When the tilt controller 124 determines that the tilt error signal is not zero (No in step S1806), the tilt controller 124 returns to the center value detection of the track position error signal and repeats the process (step S1803).

When the tilt controller 124 determines that the tilt error signal is zero (YES in step S1806), the current output value is held as the tilt compensation amount (step S1807), and stored in the tilt compensation amount storage unit 130 together with the output of the encoder 121 of the positioning unit 112 (step S1808).

In the optical disk apparatus 100 according to the first embodiment, the corrected value of the tilt error signals in the data area and the system read-in area which has a different track pitch from the track pitch in the data area is utilized. When the system read-out area has a different track pitch from that of the data area, however, a corrected amount of the tilt error signal may be obtained from the system read-out area similarly to the signal from the system read-in area, and may be employed for the correction of the tilt error signal in the data area.

Thus, in the optical disk apparatus 100 according to the first embodiment, the difference in polarity of the offset amounts in the areas with different track pitches is utilized for the elimination of the factors influenced by the offset of the track position error signal other than the tilt error signal, whereby the accurate calculation of the value of the tilt error signal is allowed.

Next, a second embodiment will be described.

An optical disk apparatus 2200 according to the second embodiment utilizes the difference in polarity of the track position error signals detected from the areas with different track pitches in the optical disk, and detects that the plural areas have different track pitches. Thus the process of area detection is simplified, and the efficient calculation of an accurate tilt error signal is allowed.

Figure 22:
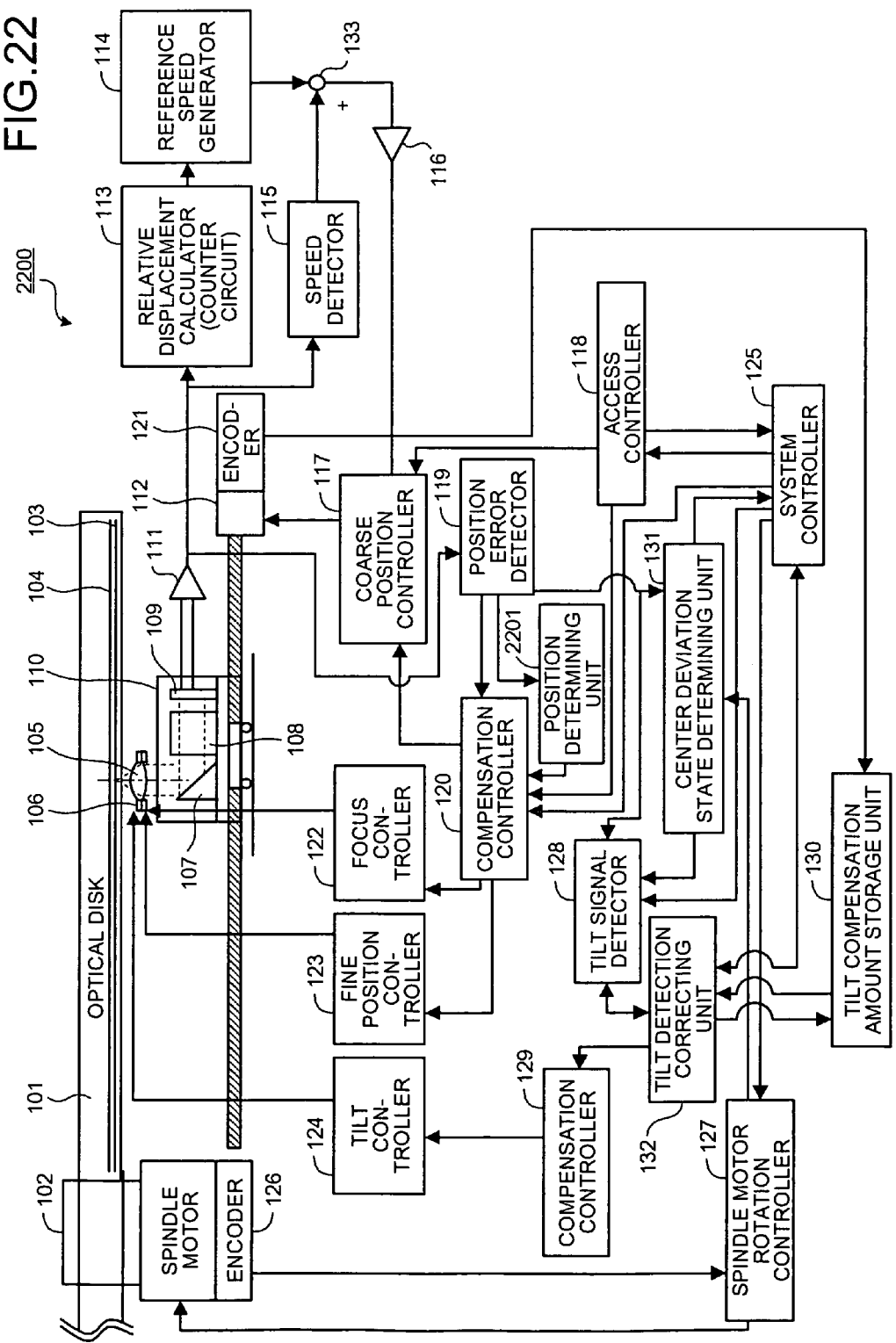
FIG. 22 is a block diagram of a structure of the optical disk apparatus according to a second embodiment.

FIG. 22 is a block diagram of a structure of the optical disk apparatus 2200 according to the second embodiment. As shown in FIG. 22, the optical disk apparatus 2200 includes the spindle motor 102, the objective lens 105, the lens driver 106, the optical head 110, the operation amplifying circuit 111, the positioning unit 112, the relative displacement calculator 113, the reference speed generator 114, the speed detector 115, the amplifier 116, the coarse position controller 117, the access controller 118, the position error detector 119, the compensation controller 120, the encoder 121, the focus controller 122, the fine position controller 123, the tilt controller 124, the system controller 125, the encoder 126, the spindle motor rotation controller 127, the tilt signal detector 128, the compensation controller 129, the tilt compensation amount storage unit 130, the center deviation state determining unit 131, the tilt detection compensating unit 132, the comparison circuit 133, and a position determining unit 2201.

The optical disk apparatus 2200 according to the second embodiment is different from the optical disk apparatus 100 according to the first embodiment in that the optical disk apparatus 2200 includes the position determining unit 2201.

Other structure and function of the optical disk apparatus 2200 are the same as the structure and function of the optical disk apparatus 100 as shown in the block diagram of FIG. 1, and the same elements are denoted by the same reference characters and the description thereof will not be repeated.

The position determining unit 2201 serves to determine that the optical spot is condensed on an area with a different track pitch on the optical disk 101 when the polarity of the offset amount of the track position error signal changes.

Figure 23:
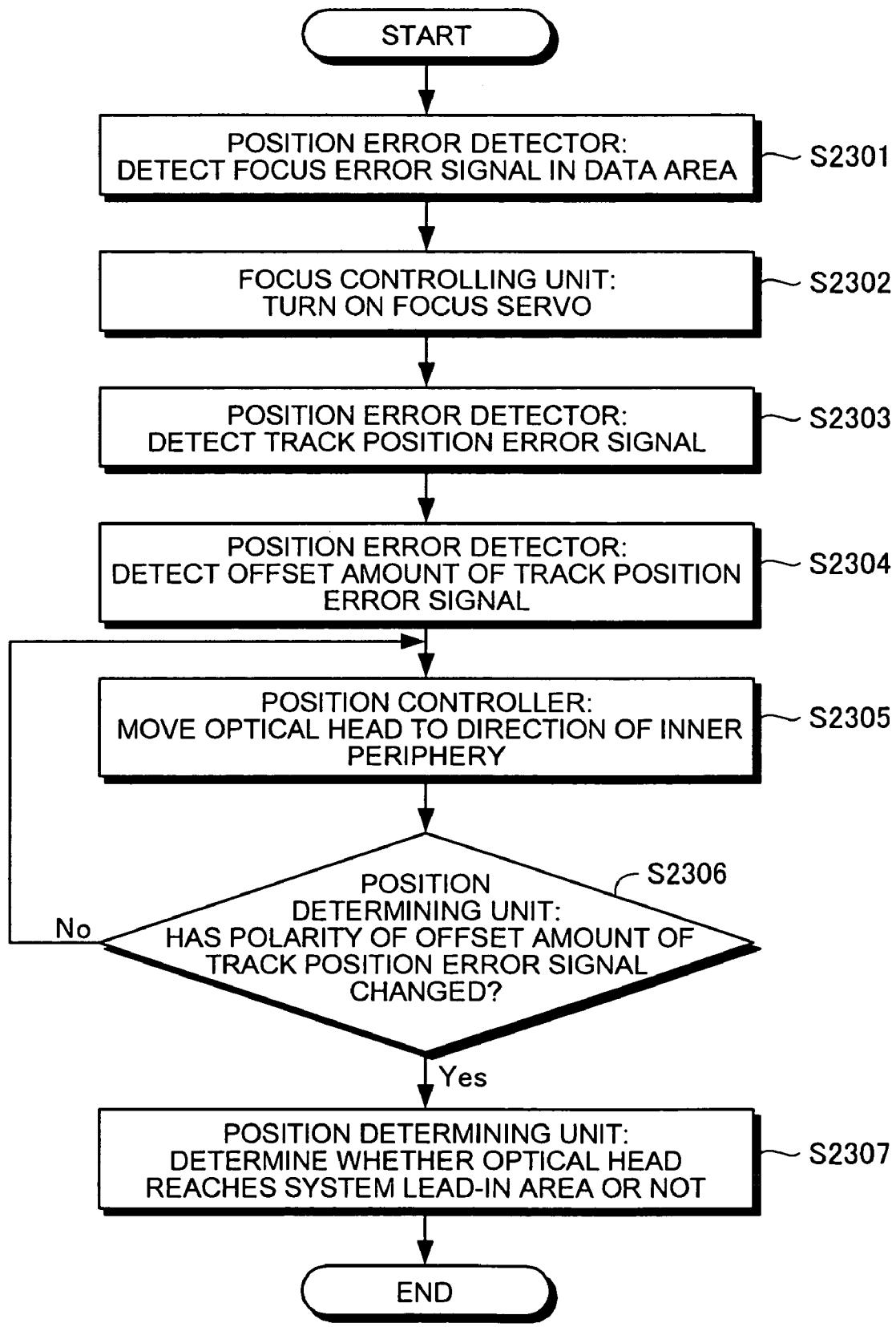
FIG. 23 is a flowchart of position determination in the optical disk apparatus according to the second embodiment.

Next, the recording and the reproduction of information by the optical disk apparatus 2200 according to the second embodiment with the above-described structure will be described. FIG. 23 is a flowchart of a process sequence of determination on a transition from the data area to the system read-in area, i.e., a process to determine whether a currently accessed area transits from the data area to the system read-in area or not.

First, the position error detector 119 detects the focus error signal in the data area (step S2301), and the focus controller 122 starts the focus servo (step S2302). Then, the position error detector 119 detects the track position error signal (step S2303), to detect the offset amount of the track position error signal (step S2304). Thereafter, while maintaining the monitoring of the offset amount, the coarse position controller 117 and the fine position controller 123 move the optical head 110 toward the inner periphery (step S2305).

Then, the position determining unit 2201 determines whether the polarity of the offset amount of the track position error signal changes or not (step S2306).

When the position determining unit 2201 determines that the polarity of the offset amount of the track position error signal does not change (No in step S2306), the coarse position controller 117 and the fine position controller 123 moves the optical head 110 further towards the direction of the inner periphery (step S2305). When the position determining unit 2201 determines that the polarity of the offset amount of the track position error signal changes (Yes in step S2306), the position determining unit 2201 determines that the optical head 110 reaches the system read-in area (step S2307).

Though in the above description, the optical disk apparatus 2200 according to the second embodiment is shown to access the system read-in area which has a different track pitch from that in the data area, when the system read-out area has a different track pitch from that in the data area, determination on a transition to the system read-out area can be made according to the same procedure.

Thus, in the optical disk apparatus 2200 according to the second embodiment, it can be readily determined whether the optical spot reaches the system read-in area or not through monitoring of the offset amount of the track position error signal without acquisition of data on radial position or look-up to the movement history of the optical spot dissimilar to the conventional technique. Thus, the highly accurate tilt error signal can be efficiently calculated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus comprising:
   an objective lens that condenses light on an information recording layer of an optical disk which has a first area with a first track pitch and a second area with a second track pitch different from the first track pitch, to form an optical spot;
   a tilt driver that inclines the objective lens;
   a positioning unit that positions the optical spot on a target track;
   a position error detector that detects a position error of the optical spot from the target track to which the positioning unit positions the optical spot;
   a tilt detection correcting unit that calculates a tilt error signal based on a first position error detected by the position error detector when the optical spot is positioned on a target track in the first area and a second position error detected by the position error detector when the optical spot is positioned on a target track in the second area; and
   a tilt controller that controls the tilt driver based on the tilt error signal calculated by the tilt detection correcting unit.

2. The optical disk apparatus according to claim 1, wherein the tilt detection correcting unit calculates the tilt error signal based on an offset amount in the first position error and an offset amount in the second position error.

3. The optical disk apparatus according to claim 2, wherein the tilt detection correcting unit calculates the tilt error signal based on a difference between the offset amount in the first position error and the offset amount in the second position error.

4. The optical disk apparatus according to claim 3, wherein the tilt detection correcting unit calculates the tilt error signal according to the equation $$\text{TiltErr} = (TED_{off} - TEL_{off})/(K1 - K2)$$

where TiltErr is the tilt error signal, $TED_{off}$ is the offset amount in the first area, $TEL_{off}$ is the offset amount in the second area, and K1 and K2 are constant values.

5. The optical disk apparatus according to claim 4, wherein the first area is a data area, and the second area is a system read-in area.

6. The optical disk apparatus according to claim 4, wherein the first area is a data area and the second area is a system read-out area.

7. The optical disk apparatus according to claim 1, further comprising a position determining unit that determines that the track pitch of the first area is different from the track pitch of the second area when the first position error has a different polarity from a polarity of the second position error.

8. The optical disk apparatus according to claim 7, wherein the position error detector detects the position error of each of the first area and the second area when the position determining unit determines that the track pitches are different.

9. The optical disk apparatus according to claim 8, wherein the positioning unit performs positioning of the optical spot to the target track in the first area, and positioning of the optical spot to the target track in the second area, and the position determining unit determines that the optical spot reaches from the first area to the second area when the polarity of the first position error is different from the polarity of the second position error.

10. The optical disk apparatus according to claim 9, wherein
   the position determining unit determines that the optical spot reaches from the data area to the system read-in area when the polarity of the first position error is different from the polarity of the second position error.

11. The optical disk apparatus according to claim 9, wherein the position determining unit determines that the optical spot reaches from the data area to the system read-out area when the polarity of the first position error is different from the polarity of the second position error.

12. A method of tilt control comprising:

condensing light by an objective lens on an information recording layer of an optical disk which has a first area with a first track pitch and a second area with a second track pitch that is different from the first track pitch, to form an optical spot;

positioning the optical spot on a target track of the first area;

detecting a first position error of the optical spot from the target track, to which the optical spot is positioned, in the first area;

positioning the optical spot on a target track of the second area;

detecting a second position error of the optical spot from the target track of the second area to which the optical spot is positioned;

calculating a tilt error signal based on the first position error and the second position error; and controlling a tilt driver that inclines the objective lens based on the calculated tilt error signal.

* * * * *